United States Patent
Thangarasa et al.

(10) Patent No.: US 10,212,650 B2
(45) Date of Patent: *Feb. 19, 2019

(54) CELL SEARCH FOR D2D ENABLED UES IN OUT OF NETWORK COVERAGE

(71) Applicant: Telefonaktiebolaget LM Ericsson (publ), Stockholm (SE)

(72) Inventors: Santhan Thangarasa, Vällingby (SE); Muhammad Kazmi, Sundbyberg (SE); Joakim Axmon, Kävlinge (SE); Stefano Sorrentino, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/815,525

(22) Filed: Nov. 16, 2017

(65) Prior Publication Data

US 2018/0098274 A1   Apr. 5, 2018

Related U.S. Application Data

(63) Continuation of application No. 15/025,715, filed as application No. PCT/SE2016/050073 on Feb. 1, 2016, now Pat. No. 9,843,992.

(Continued)

(51) Int. Cl.
*H04W 4/00* (2018.01)
*H04W 48/16* (2009.01)
(Continued)

(52) U.S. Cl.
CPC ........... *H04W 48/16* (2013.01); *H04W 48/20* (2013.01); *H04W 76/14* (2018.02); *H04W 76/19* (2018.02);
(Continued)

(58) Field of Classification Search
CPC . H04W 48/16; H04W 76/028; H04W 76/023; H04W 88/06
(Continued)

(56) References Cited

U.S. PATENT DOCUMENTS 8,447,005 B2    5/2013   Axmon et al.
8,504,029 B2    8/2013   Axmon et al.
(Continued)

OTHER PUBLICATIONS

Author Unknown, "Technical Specification Group Radio Access Network; Evolved Universal Terrestrial Radio Access (E-UTRA); User Equipment (UE) radio transmission and reception (Release 12)," Technical Specification 36.101, Version 12.6.0, 3GPP Organizational Partners, Dec. 2014, 589 pages.
(Continued)

*Primary Examiner* — Amancio Gonzalez
(74) *Attorney, Agent, or Firm* — Sage Patent Group

(57) ABSTRACT

There is disclosed a method for operating a D2D enabled UE for a cellular communication network. The method comprises performing a cell search in an out of coverage condition of the UE, wherein performing a cell search is based on a first measurement configuration during a first phase, and based on a second measurement configuration during a second phase, wherein the first measurement configuration pertains to a carrier whose sidelink is preconfigured for ProSe operation in out of network coverage operation.

The disclosure also pertains to related methods and devices.

20 Claims, 10 Drawing Sheets

Related U.S. Application Data

(60) Provisional application No. 62/110,868, filed on Feb. 2, 2015.

(51) Int. Cl.
*H04W 76/14* (2018.01)
*H04W 76/19* (2018.01)
*H04W 48/20* (2009.01)
*H04W 8/00* (2009.01)
*H04W 8/22* (2009.01)
*H04W 88/06* (2009.01)

(52) U.S. Cl.
CPC .............. *H04W 8/005* (2013.01); *H04W 8/22* (2013.01); *H04W 88/06* (2013.01)

(58) Field of Classification Search
USPC ........................................................ 455/434
See application file for complete search history.

(56) References Cited

U.S. PATENT DOCUMENTS

| | | | |
|---|---|---|---|
| 8,675,788 | B2 | 3/2014 | Andgart et al. |
| 9,369,950 | B2 | 6/2016 | Berggren et al. |
| 9,843,992 | B2 * | 12/2017 | Thangarasa ........... H04W 76/14 |
| 2013/0288668 | A1 | 10/2013 | Pragada et al. |
| 2014/0056220 | A1 | 2/2014 | Poitau et al. |
| 2016/0044618 | A1 | 2/2016 | Sheng et al. |
| 2016/0309355 | A1 | 10/2016 | Seo et al. |

OTHER PUBLICATIONS

Author Unknown, "Technical Specification Group Radio Access Network; Evolved Universal Terrestrial Radio Access (E-UTRA); Requirements for support of radio resource management(Release 12)," Technical Specification 36.133, Version 12.6.0, 3GPP Organizational Partners, Dec. 2014, 992 pages.

Author Unknown, "Technical Specification Group Services and System Aspects; Study on architecture enhancements to support Proximity Services (ProSe) (Release 12)," Technical Report 23.703, Version 0.4.1, 3GPP Organizational Partners, Jun. 2013, 85 pages.

Author Unknown, "Technical Specification Group Services and System Aspects; Study of charging support of Proximity-based Services (ProSe) Direct Communication for Public Safety use (Release 12)," Technical Report 32.844, Version 12.0.0, 3GPP Organizational Partners, Dec. 2014, 27 pages.

Qualcomm Incorporated, et al., "R4-148058: CR on RRM requirement for D2D," 3rd Generation Partnership Project (3GPP), Change Request 36.133, CR 2653, Revision 2, Current Version 12.5.0, TSG-RAN WG4 Meeting #73, Nov. 17-21, 2014, 19 pages, San Francisco, USA.

RAN4, "R4-147813: LS on pre-configured parameters for D2D," 3rd Generation Partnership Project (3GPP), TSG-RAN WG4 Meeting #73, Nov. 17-21, 2014, 1 page, San Francisco, USA.

SA2, "S2-144638: Latest progress on Prose in SA2," 3rd Generation Partnership Project (3GPP), SA WG2 Meeting #106, Nov. 17-21, 2014, 1 page, San Francisco, USA.

International Search Report and Written Opinion for International Patent Application No. PCT/SE2016/050073, dated Apr. 13, 2016, 14 pages.

Non-Final Office Action for U.S. Appl. No. 15/025,715, dated Nov. 3, 2016, 11 pages.

Final Office Action for U.S. Appl. No. 15/025,715, dated Apr. 28, 2017, 18 pages.

Notice of Allowance for U.S. Appl. No. 15/025,715, dated Aug. 10, 2017, 8 pages.

\* cited by examiner

CELL SEARCH FOR D2D ENABLED UES IN OUT OF NETWORK COVERAGE

This application is a continuation of U.S. patent application Ser. No. 15/025,715, filed Jun. 20, 2016, now U.S. Pat. No. 9,843,992, which is a 35 U.S.C. § 371 national phase filing of International Application No. PCT/SE2016/050073, filed Feb. 1, 2016, which claims the benefit of U.S. Provisional Application No. 62/110,868, filed Feb. 2, 2015, the disclosures of which are incorporated herein by reference in their entireties.

TECHNICAL FIELD

The present disclosure pertains to the field of wireless communication technology, in particular to D2D technology.

BACKGROUND

In wireless communication, D2D technology allows direct communication between UEs, even if out of coverage of a network or base station. However, in out of coverage scenarios, a UE still has to perform cell search to re-establish cellular communication.

SUMMARY

An object of the present disclosure is to provide approaches allowing predictable and well-defined cell search behaviour of a D2D enabled UE when it is out of coverage, and/or allowing quick cell search in such a situation.

Accordingly, there is disclosed a method for operating a D2D enabled UE for a cellular communication network. The method comprises performing a cell search in an out of coverage (OOC or ONC) condition of the UE. Performing a cell search is based on a first measurement configuration during a first phase, and based on a second measurement configuration during a second phase. The first measurement configuration pertains to a carrier whose sidelink is preconfigured for ProSe operation in out of network coverage operation.

Moreover, there is disclosed a D2D enabled UE for a cellular communication network. The D2D enabled UE is adapted for performing a cell search in an out of coverage (OOC or ONC) condition of the UE, wherein performing a cell search is based on a first measurement configuration during a first phase, and performing a cell search is based on a second measurement configuration during a second phase. The first measurement configuration pertains to a carrier whose sidelink is preconfigured for D2D operation in out of network coverage operation.

A method for operating a network node for a wireless communication network is also suggested. The method comprises configuring a D2D enabled UE with a first measurement configuration, wherein the first measurement configuration pertains to a carrier whose sidelink is preconfigured for D2D operation in out of network coverage operation.

There is also disclosed a network node for a wireless communication network. The network node is adapted for configuring a D2D enabled UE with a first measurement configuration, wherein the first measurement configuration pertains to a carrier whose sidelink is preconfigured for D2D operation in out of network coverage operation.

Furthermore, a program product comprising code executable by control circuitry is proposed. The code causes the control circuitry to carry out and/or control any one of the methods for operating a user equipment or network node as described herein.

Moreover, there is disclosed a carrier medium arrangement carrying and/or storing at least any one of the program products described herein and/or code executable by control circuitry, the code causing the control circuitry to perform and/or control at least any one of the methods described herein.

The approaches described herein facilitate quick (depending on the conditions) and well-defined cell search.

BRIEF DESCRIPTION OF THE DRAWINGS

The drawings are provided to illustrate concepts and approaches of the disclosure and are not intended as limitation. The drawings comprise:

FIG. 8, schematically showing a D2D enabled UE;

FIG. 10, schematically showing a network node.

DETAILED DESCRIPTION

Figure 1:
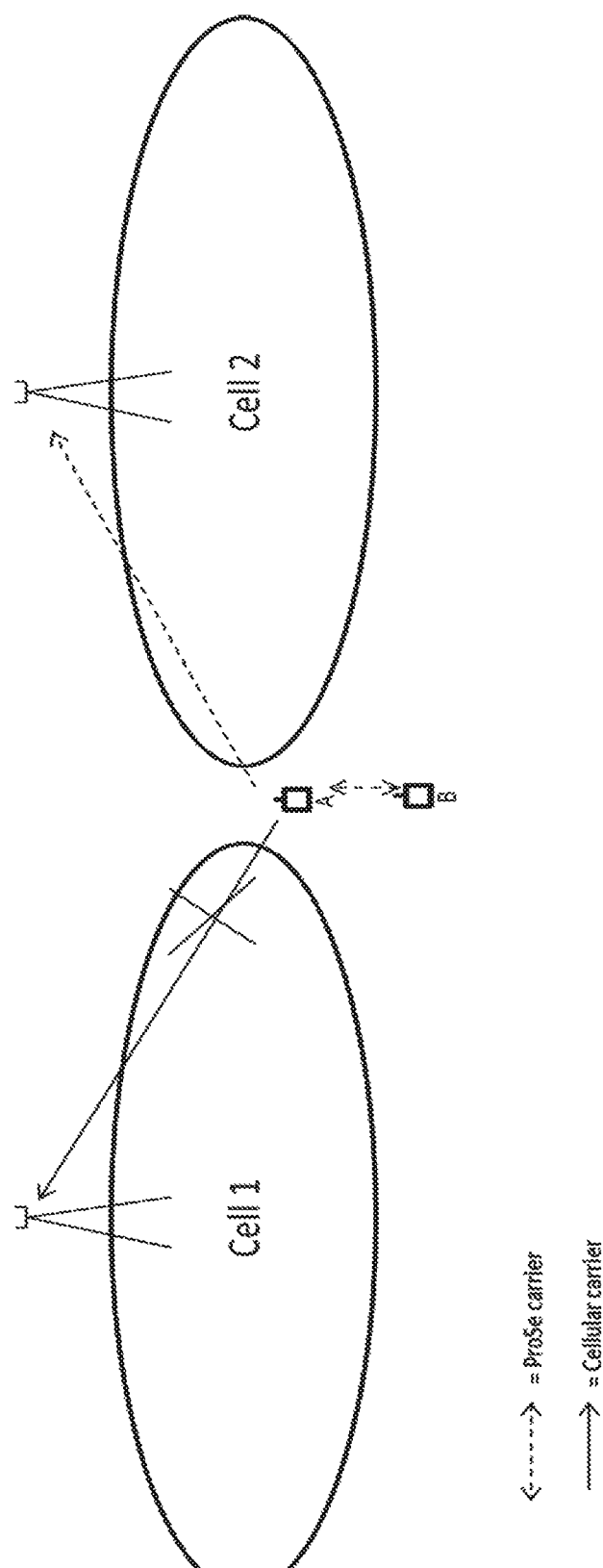
FIG. 1, illustrating a scenario in which a D2D capable UE has lost its coverage.

UE measurements are discussed in the following.

Radio (UE) measurements done by the UE are typically performed on the serving as well as on neighbor cells over some known reference symbols or pilot sequences. The measurements are done on cells on an intra-frequency carrier, inter-frequency carrier(s) as well as on inter-RAT carriers(s) (depending upon the UE capability whether it supports that RAT). To enable inter-frequency and inter-RAT measurements for the UE requiring gaps, the network has to configure the measurement gaps.

The measurements are done for various purposes. Some example measurement purposes are: mobility, positioning, self-organizing network (SON), minimization of drive tests (MDT), operation and maintenance (O&M), network planning and optimization etc. Examples of measurements in LTE are Cell identification aka PCI acquisition, Reference symbol received power (RSRP), Reference symbol received quality (RSRQ), CGI acquisition, Reference signal time difference (RSTD), UE RX-TX time difference measurement, Radio link monitoring (RLM), which consists of Out of synchronization (out of sync) detection and In synchronization (in-sync) detection etc. CSI measurements performed by the UE are used for scheduling, link adaptation etc. by network. Examples of CSI measurements or CSI reports are CQI, PMI, RI etc. They may be performed on reference signals like CRS, CSI-RS or DMRS.

Radio network node radio measurements are discussed in the following.

In order to support different functions such as mobility (e.g. cell selection, handover etc), positioning a UE, link adaption, scheduling, load balancing, admission control, interference management, interference mitigation etc, the radio network node also performs radio measurements on signals transmitted and/or received by the radio network node. Examples of such measurements are SNR, SINR, received interference power (RIP), BLER, propagation delay between UE and itself, transmit carrier power, transmit power of specific signals (e.g. Tx power of reference signals), positioning measurements like TA, eNode B Rx-Tx time difference etc.

Cell Search is discussed in the following.

The DL subframe #0 and subframe #5 carry synchronization signals (i.e. both PSS and SSS). In order to identify an unknown cell (e.g. new neighbor cell) the UE has to acquire the timing of that cell and eventually the physical cell ID (PCI). Subsequently the UE also measures RSRP and/or RSRQ of the newly identified cell in order to use itself and/or report the measurement to the network node. In total there are 504 PCIs. Therefore the UE searches or identifies a cell (i.e. acquire PCI of the cell) by correlating the received PSS/SSS signals in DL subframe #0 and/or in DL subframe #5 with one or more of the pre-defined PSS/SSS sequences. The use of subframe #0 and/or in DL subframe #5 for PCI acquisition depends upon its implementation. The UE regularly attempts to identify neighbor cells on at least the serving carrier frequenc(ies). But it may also search cells on non-serving carrier(s) when configured by the network node. In order to save UE power consumption, typically the UE searches in one of the DL subframes #0 and #5. In order to further save its battery power the UE searches the cell once every 40 ms in non-DRX or in short DRX cycle (e.g. up to 40 ms). In longer DRX cycle the UE typically searches a cell once every DRX cycle. During each search attempt the UE typically stores a snapshot of 5-6 ms and post process by correlating the stored signals with the known PSS/SSS sequences. In non-DRX the UE is able to identify an intra-frequency cell (including RSRS/RSRQ measurements) within 800 ms (i.e. 20 attempts in total including 15 and 5 samples for cell identification (PCI acquisition) and RSRP/RSRQ measurement).

D2D Operation is discussed in the following.

D2D enabled UEs generally transmit D2D signals or channels in the uplink part of the spectrum. D2D operation (which may also be called ProSe communication; a D2D communication connection or link may also be called sidelink) by a UE is in a half-duplex mode, i.e. the UE can either transmit D2D signals/channels or receive D2D signals/channels. There may also be D2D relay UEs that may relay some signals to other D2D enabled UEs. There is also control information for D2D, some of which is transmitted by D2D enabled UEs and the other is transmitted by an control node or allocation node like an eNodeB (e.g., D2D resource grants for D2D communication transmitted via cellular DL control channels). The D2D transmissions may occur on resources which are configured by the network or selected autonomously by the D2D enabled UE.

D2D communication may imply transmitting by a D2D transmitter D2D data and D2D communication control information with scheduling assignments (SAs) to assist D2D receivers of the D2D data. The D2D data transmissions may be according to configured patterns and in principle may be transmitted rather frequently. SAs are transmitted periodically. D2D transmitters that are within the network coverage (e.g. within a serving cell and/or in communication with a cellular network, e.g. via an eNodeB) may request eNodeB resources for their D2D communication transmissions and receive in response D2D resource grants for SA and D2D data. Furthermore, eNodeB may broadcast D2D resource pools for D2D communication.

D2D discovery messages are transmitted in infrequent periodic subframes. eNodeBs may broadcast D2D resource pools for D2D discovery, both for reception and transmission. It should be noted that in the context of this specification, eNodeB may be seen as an example for a network node or allocation node or control node and may me generalized accordingly.

The D2D communication may support two different modes of D2D operation: mode 1 and mode 2.

In mode 1, the location of the resources for transmission of the scheduling assignment by the broadcasting UE comes from the eNodeB. The location of the resource(s) for transmission of the D2D data by the broadcasting UE comes from the eNodeB.

In mode 2 a resource pool for scheduling assignment is pre-configured and/or semi-statically allocated. The UE on its own selects the resource for scheduling assignment from the resource pool for scheduling assignment to transmit its scheduling assignment.

PCell interruption of 1 subframe occurs when UE switches its reception between D2D-to-WAN or WAN-to-D2D. This is because the UE receiver chain needs to be retuned every time the operation is switched from WAN to D2D reception and from D2D to WAN reception. This applies to both D2D discovery and D2D communication capable UEs. It is important to partition uplink resources between cellular uplink and D2D operation in such a way that avoids or minimize the risk of switching taking place in certain subframe, subframe #0 and/or #5, of PCell. These subframes contain essential information such as PSS/SSS that are necessary for doing cell search, carrying out cell measurements and they also contain MIB/SIB1 information which is necessary for SI reading procedures. In addition to interruption that takes places due to switching, there may be additional interruption of 1 subframe due to the RRC reconfiguration procedure. While the switching interruption takes place for single rx UE (e.g. D2D discovery capable UEs), the RRC reconfiguration interruption takes place for all types of D2D enabled UEs (e.g. D2D Discovery capable and D2D Communication capable).

D2D operation is a generic term which may comprise transmission and/or reception of any type of D2D signals (e.g. physical signals, physical channel etc) by a D2D communication capable UE and/or by D2D discover capable UE. D2D operation is therefore also called as D2D transmission, D2D reception, D2D communication etc, depending on which form of operation is performed.

A D2D enabled UE may also interchangeably be called ProSe capable UE. A D2D discovery capable UE is also referred to as UE capable of ProSe direct discovery and a D2D direct communication UE is also referred to as UE capable of ProSe direct communication. The link/carrier that is used for the D2D/ProSe direct communication and D2D/ProSe direct discovery between UEs may be referred to as sidelink.

D2D operation in out of network coverage (ONC) is a new scenario. D2D enabled UEs can be pre-configured (e.g. by a network node and/or the network, which may be correspondingly adapted) with ProSe resources that the UEs use when they are out of network coverage. Examples of ProSe resources are ProSe subframes, time slots, physical channels such as resource blocks within ProSE subframes or time slots etc. These pre-configured resources are intended to be used only in out of network coverage scenario. If they are used inside the cellular cells or in close proximity of cellular cells, D2D enabled UEs may cause interference and harm the cellular cells. To further minimize interference during ProSe operation in ONC operation, the D2D enabled UEs can further be configured with one or more parameters associated with the pre-configured ProSe resources. These parameters ensure that UE operates with reduced power and lowers emissions in carriers outside that of the side link. Examples of these parameters associated with ProSe resource parameters are P-Max-ProSe and additionalSpectrumEmissions-ProSe. D2D enabled UE behavior on how the pre-configured ProSe resources shall be controlled when a new cell is detected is not defined. Due to lack of UE behavior and corresponding performance requirements, the use of ProSe resources by the D2D enabled UE when it enters inside the network coverage may cause interference to the WAN i.e. where one or more WAN cells are operating and can receive signals from the D2D enabled UE.

There are suggested methods and devices for cell detection for D2D enabled UEs in out of network coverage that can be implemented in D2D capable UEs.

An approach for operating a ProSe UE for detecting a cell and stopping the use of pre-configured resources for ProSe operation when the ProSe UE is in out of network coverage may comprise:

The ProSe UE upon entering in out of network coverage at time T1 until a first phase shall continuously detect cells belonging to:
  the intra-frequency of the last PCell within the existing intra-frequency cell search delay defined as defined below, provided that the UE has been in out of network coverage for not more than X seconds,
  the inter-frequency carriers configured for measurements by the last PCell within the existing inter-frequency cell search delay for gap Id #0 defined below, provided that the UE has been in out of network coverage for not more than Y seconds,
  the inter-RAT carriers configured for measurements by the last PCell within the existing inter-RAT cell search delay for gap Id #0 defined in section below, provided that the UE has been in out of network coverage for not more than Z seconds.

If the UE is unable to detect any cell on the intra-frequency, the configured inter-frequency or the configured inter-RAT carriers during the first phase (i.e. within (T2 −T1)=MAX (X, Y, Z) or in some embodiment within (T2 −T1)+(T3−T2), where (T3−T2)=MAX (X', Y', Z')), then the UE shall also continuously detect cells on carriers of all frequency bands supported by the UE during a second phase. Where X', Y' and Z' are the durations for detecting intra-frequency, inter-frequency and inter-RAT cells respectively.

If the UE is able to detect any cell on the intra-frequency, the configured inter-frequency or the configured inter-RAT carriers during the first phase (i.e. within (T2−T1) or (T2−T1)+(T3−T2) in some embodiments) on any other carrier, then the UE shall stop using resources for ProSe pre-configured by the last PCell.

If the newly detected cell during the first or the second phase supports ProSe then the UE may use radio resources assigned by the new cell for ProSe operation.

There is also discussed a method for operating a network node serving a ProSe capable UE, comprising:
  determining based on one or more criteria (e.g. UE band/RAT capabilities) a first measurement configuration and a second measurement configuration to be used by the ProSe UE for detecting cells during the first phase and the second phase when the UE operates in an out of network coverage;
  configuring the UE with the determined first and the second measurement configurations.

This approach enables the legacy UEs in the new cells to be served more efficiently and quickly by only avoiding or reducing the interference caused by pre-configured ProSe resources on cells in the proximity of the UEs. Also, the protection of reception quality of one or more cells when ProSe UE is in ONC is facilitated. The cells may belong to any carrier or RAT. The approach moreover enables D2D enabled UEs out of network coverage to more quickly find neighboring or new cells.

In some embodiments a general term "network node" is used, which can correspond to any type of radio network node or any network node adapted for or in communication with a UE and/or with another network node. Examples of network nodes are NodeB, MeNB, SeNB, a network node belonging to MCG or SCG, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC), MDT etc.

Also, in some cases the non-limiting term user equipment (UE) is used, which refers to any type of wireless device adapted for communicating with a network node and/or with another UE in a cellular or mobile communication system; the UE may be D2D enabled and/or adapted for out of coverage communication e.g. with another D2D enabled UE. Examples of UEs are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles etc.

In some embodiment term out of coverage (OOC) is used. OOC may also interchangeably be called as out-of-network (ONC) coverage, out of WAN coverage, out of cellular coverage, any cell selection state etc. In this scenario D2D enabled UEs communicating with each other are not under network node coverage. It means that the D2D enabled UEs cannot receive signals from and/or transmit signals to any network node in the (or any) network using cellular communication. Typically, the lack of coverage (OOC) is due to complete absence of the network coverage in the vicinity of the D2D enabled UE, e.g. due to weak or non-existent signals (or the UE in question not yet being aware that it has entered coverage again, e.g. due to not having performed a successful cell search procedure). Thus, the D2D enabled UEs cannot use timing and frequency synchronization based on signals from any cell in the network. It such a condition, the UE may perform cell search The embodiments are described for LTE. However the embodiments are applicable to any RAT or multi-RAT systems, where the UE receives and/or transmit signals (e.g. data) e.g. LTE FDD/TDD, WCDMA/HSPA, GSM/GERAN, Wi Fi, WLAN, CDMA2000 etc.

Some embodiments are described as:
General description of a scenario
A method in a D2D enabled UE in out of network coverage for performing cell identification procedure A method in a network node configuring a D2D enabled UE with carrier/s for cell detection in out of network coverage A general scenario description is provided in the following.

A scenario may comprise at least one network node serving a first cell, say PCell (Primary Cell) aka serving cell. The D2D capable UE (which may also be called D2D enabled UE or ProSe enabled UE, or short D2D UE or ProSe UE, or even shorter just UE) can be pre-configured by the PCell (respectively, by the network node via the PCell) with ProSe resources for ProSe operation of the D2D ENABLED on a sidelink. The pre-configured ProSe resources may in particular be used by the D2D enabled UE when operating in ONC. The sidelink may typically operate on a carrier of the PCell (aka serving carrier frequency or intra-frequency carrier). The sidelink may also be configured for ProSe operation on a non-serving carrier of the D2D enabled UE e.g. inter-frequency carrier frequency for WAN measurements or carrier frequency only configured for ProSe operation.

In some embodiments the D2D capable UE may also be configured with another cell that is configurable upon need basis, say SCell1 (Secondary Cell 1). In some embodiment the SCell1 may be served by a second network node. The embodiments apply regardless of whether PCell and one or more SCells are served by the same or different network nodes. In this case, the D2D capable UE can be pre-configured, e.g., by the network node) with ProSe resources for ProSe operation on sidelink which may operate on carrier of PCell or of SCell or of any non-serving carrier. The D2D capable UE can be pre-configured with ProSe resources for ProSe operation on plurality of sidelinks, e.g. carriers of PCell, SCell1 and non-serving carrier.

The network node may also configure the D2D capable UE with a third cell, SCell2 on a different carrier on need basis. The embodiments presented in this description apply for UE configured with CA (Carrier Aggregation) with any number of SCells. In some embodiments the UE may be configured with PCell and PSCell (Primary Secondary Cell) or with PCell, PSCell and one or more SCells such as in dual connectivity. The configured cells are UE specific and the embodiments included in this disclosure may be applied on UE basis on the each configured cell.

There may typically be two types of UEs in the network; the first type, type 1, being the cellular capable UE operating cellular traffic aka WAN capable UE or legacy UE. The second type, type 2, of UE is the D2D capable UE, which are also capable of cellular operation. The type2 can be configured to operate for only WAN traffic in case D2D operation is not required. The UEs can be configured to operate on any cells. The embodiments apply when at least one type 2 UE is available in the network. Such a UE can be configured with at least one SCell. The PCell, PSCell and SCell(s) are UE specific. However plurality of UEs can be configured with the same cell as their PCell or SCell or PSCell. Therefore typically a group of UEs may have the same PCell, which is different than the PCell of another group of UEs.

The D2D enabled UE is able to operate some D2D operations while being out of network coverage. Examples of such operations are D2D Communication, D2D discovery etc. They may further comprise of D2D transmission, D2D reception etc. FIG. 1 illustrates the scenario in which a D2D capable UE has lost its coverage to an old PCell (Cell 1) and is searching for a new cell (Cell 2). The D2D enabled UE configured with one or more SCells, may have lost all serving cells to be in ONC i.e. lost PCell and SCell(s).

While being out of network coverage, the D2D enabled UE (UE A) is synchronized with another D2D capable UE (UE B) and it performs D2D communication. The synchronization herein means that the UE-A uses UE-B as the timing source (aka synchronization) for transmitting D2D signals. The presented solution addresses the problem of UE A in this scenario harming (causes interference) on Cell 2 due to that the UE A performs D2D operation using the pre-configured with ProSe resources for operation in out of network coverage.

Prior to entering in ONC, the D2D enabled UE may also be configured by the last serving cell (e.g. PCell and/or SCell(s)) with one or more carriers for doing measurements on the cells of the configured carriers. The D2D enabled UE may be configured with such carrier(s) for measuring in idle state and/or in connected state. The UE may also be pre-configured with one or more carriers specifically for D2D operation in ONC. In some embodiments these D2D specific carriers may be the same as the serving carriers. The same or different set of carriers may be configured for measurements in idle state and connected state. Examples of such carriers are serving carriers (e.g. intra-frequency aka serving carrier, PCC, SCC(s) PSCC etc) and non-serving carriers (e.g. inter-frequency carriers, inter-RAT carriers etc).

A method in a D2D enabled UE in out of network coverage for performing cell identification procedure is described in the following.

This embodiment discloses a method for operating (and/or being carried out or implemented in) a D2D capable UE (as well as a correspondingly adapted UE), wherein the UE may be out of network coverage or in the process of entering such a state. According to the method, the D2D capable UE may adapt its cell search procedure based on whether the UE is pre-configured with ProSe resources or not. Resources may be pre-configured using some parameters that are configured for out-of-coverage scenarios. Examples of such parameters are ProSe subframes, time slots, physical channels such as resource blocks within ProSE subframes or time slots etc. The D2D enabled UE may also be configured by the network node, e.g. using higher layer signaling, with one or more emission control parameters such as maximum power etc. The D2D enabled UE may apply the emission control parameters when transmitting ProSe signaling using pre-configured ProSs resources for ProSe operation in ONC. Specific examples of emission control parameters are:

P-Max-ProSe; parameter used to limit the maximum transmit power when the ProSe UE operates in out-of-coverage.

additionalSpectrumEmissions-ProSe; parameter used to adjust the transmission to meet the region-specific regulatory emission requirements when ProSe UE operates in out-of-coverage.

The pre-configured ProSe resources in the vicinity of a new cellular cell or when it detects a new cell on the cellular carrier while being in ONC may cause issues explained below.

The duration during the ProSe UE is out of network coverage may vary and the new cell which the ProSe UE detects may be of various types. The D2D enabled UE in out-of-coverage may for example detect a cell on intra-frequency, configured inter-frequency or configured inter-RAT carriers or any non-configured carrier. ProSe may or may not be supported by the new cell, respectively the corresponding network node.

The new cell may be victim to ProSe interference from the time pre-configured resources are used until the new cell is detected. But also from the time the new cell is detected and till the time the pre-configured resources are not disabled.

When the ProSe UE is camped on a cell or it has a serving cell (PCell), then the ProSe UE should use the radio resources indicated by its PCell. These are indicated by the network node (e.g. eNB) using the SIB or dedicated signaling. If ProSe UE continues to use the pre-configured radio resources which were derived particularly for the out-of-coverage scenario in in-coverage scenario, this may result in that the ProSe harming the cellular network. The victim cell may for example be a cell on intra-frequency, configured inter-frequency or configured inter-RAT carriers or any non-configured carrier. ProSe may or may not be supported by that new cell.

A ProSe UE which is out of network coverage is required to scan for new cellular cells that it can connect to. The ProSe UE can be out of network coverage for different periods, and the length of this period affects the total cell search delay. For example, if the ProSe UE has been out-of-coverage for very short time and it detects a cellular cell, then some of the old configurations may still be valid, e.g. frequency- and time synchronization. On the contrary, if the ProSe UE has been out-of-coverage for long time, the frequency- and time synchronization may have changed or the old configurations may not be valid any longer. This may lead to longer cell search time. There is suggested to define a time or time difference (e.g., X or $\Delta 1$ or $\Delta t1$), up to which the ProSe UE remembers its old receiver configuration, which may be called a threshold or memory time. And this time may be different for the different type of cells (or in other words, there may be defined different such times for different types of cells and/or applications). Instead of one time per configuration, there may be defined more than one times or thresholds associated to different phases. Examples of such configurations (in particular corresponding to a measurement configuration, which may be a first measurement configuration) are:

Time and frequency configuration and/or
Intra-band center-frequency location and/or
Supported band configuration.

It should be noted that a configuration for receiving and/or communicating in a cell may be basis for and/or equivalent to a measurement configuration, in particular if it is re-used and/or remembered for measuring.

Such a configuration may in particular comprise settings of a receiver and/or receiver circuitry, e.g. a corresponding oscillator.

Remembering these receiver configurations (e.g., by keeping them in a memory and/or keeping the corresponding circuitry/subsystems, like e.g. receiver and/or measurement system, in the respective configuration, if applicable) will lead to reduced cell search time up to a certain time at the ProSe UE. Consequently, this may reduce the time during which the new cell is subject to interference by the ProSe UE.

The following subsections discuss the UE cell search procedure (aka cell detection procedure, cell identification procedure etc) when the cells to be detected may belong to different carriers, e.g. configured and non-configured. There may be two different embodiments related to UE cell search procedure in ONC:

Detection of cells on configured carriers and non-configured carriers in series by ProSe UE in out of network coverage Detection of cells on configured carriers and non-configured carriers over at least partly parallel time by ProSe UE in out of network coverage Detection of cells by ProSe UE on configured carriers and non-configured carriers in series is discussed in the following.

In this variant, the UE first attempts to detect cells on any of the carriers configured by the UE's last PCell before the UE entered in ONC (which may be referred to as configured carriers). Examples of such carriers are last intra-frequency (i.e. carrier of the last PCell before UE entered in ONC), carrier(s) whose sidelink(s) are preconfigured for ProSe operation in out of network coverage operation, last configured inter-frequency carriers and inter-RAT carriers. In some embodiment the last intra-frequency and carrier(s) whose sidelink(s) are configured for ProSe operation in ONC may be the same. However in some embodiment the last intra-frequency and carrier(s) whose sidelink(s) are configured for ProSe operation in ONC may be different. The UE may be explicitly configured with the information about the configured carriers (e.g., by the corresponding network node). For example, the UE may be configured with one or more carrier frequency channel numbers aka EARFCN.

If no cell (in particular a cell using one of the configured carriers) is detected up to certain time in a first phase (which may be defined by a first time threshold, which in turn may define the end of the first phase, and may be defined/referred to as X or delta1 or T2), then the UE during a second phase (which may be defined by a second time threshold, e.g. Y or T2 or a corresponding time difference, e.g. delta2 identifying the end of the second phase; the beginning may be defined by the first time threshold) starts the detection of cells on all non-configured carriers on all bands supported by the UE. All carriers are treated as non-configured carriers during the second phase i.e. including the last configured carriers. These aspects are described in detail in the following sections. Both phases may be determined from a common beginning time (e.g. T1 and/or the time when an ONC condition begins/is detected or determined), wherein the respective time thresholds may be defined by suitable difference terms, e.g. delta1 and/or delta2.

Detection of new cells by ProSe UE in out of network coverage while measurement configurations are valid is discussed in the following.

In this first example, it is assumed that the newly detected cell is an intra-frequency cell. For example, it can be the same old serving cell ProSe UE was connected to before going to ONC or it can also be a new cell. The old serving cell may also be called as the last serving cell. In order to detect the new cell, the UE receiver has to first find the location of center frequency and then detect the PSS/SSS in 6 RBs located in the center frequency. The center-frequency of all intra-frequency cells (i.e. cells on the carrier of the last serving cell) is located in the same position in frequency domain i.e. have the same EARFNC. Thus the new cell is detected quicker provided that the old measurement configuration is kept within the UE at this point in time, i.e. the old receiver configurations are still applicable.

The receiver configuration may also be interchangeably called measurement configuration. The old measurement configuration may become invalid or unreliable or irrelevant because for example the UE can store such information for a limited amount of time due to limited memory. Another reason is that due to UE mobility the timing information may not be valid. Yet another reason is that the cell transmit timing may drift over time and/or cell transmit frequency may drift wrt stored synchronization information at the UE.

Figure 2:
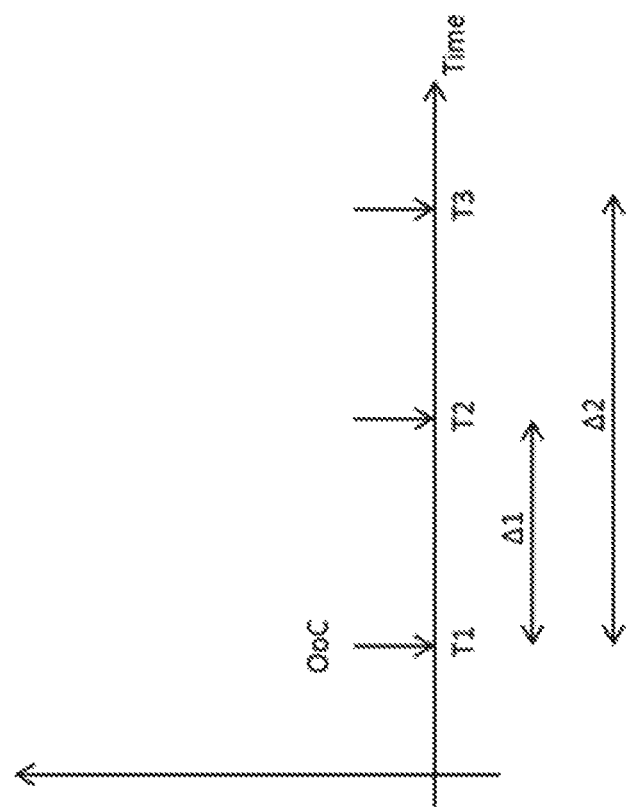
FIG. 2, showing UE cell detection in out of coverage as function of time.

FIG. 2 illustrates the events in a time-axis of a ProSe UE in an example scenario. At time T1, the UE loses its connection to PCell, i.e. it goes out of network coverage. T2 is the point in time when the UE loses its old receiver configuration or at which the old receiver configurations become invalid. The receiver configuration herein means for example information about the last serving carrier frequency (e.g. EARFNC), time synchronization to the last serving cell, synchronization to the last serving cell or to the last serving carrier frequency etc. If the UE has been out-of-coverage for long time, e.g. time greater than Δ1, that the old measurement configuration is not valid or lost, then the cell search procedure may take longer time and it may correspond to initial cell search procedure.

If the UE has been out of network coverage for not more than X seconds, wherein Δ1≤X s, cell search of a cell on the last intra-frequency carrier could be prioritized. X is the time during which the intra-frequency receiver configurations are valid. By prioritizing intra-frequency cell search with measurement configurations over others with no measurement configurations the target cell may be detected faster compared to the case if the old cell configurations are not valid.

In some embodiments the UE can detect the cell within X seconds e.g. if radio conditions are favorable such as SINR of the cell is above or equal to a threshold (e.g. −3 dB). However in some embodiments the UE can detect the cell within X' seconds, where X' is the duration starting from T2 i.e. just after duration X. This may be the case when the UE starts detecting the cell at the end of the duration of X or when the radio conditions of the cell are not very favorable such as SINR of the cell is below a threshold (e.g. −3 dB). In some embodiments the duration X' may further be scaled with the total number of configured carriers ($N_{freq\_X}$). Example of such scaling of the duration is: $X'*N_{freq\_X}$. Example of the total number of configured carriers ($N_{freq\_X}$) is the sum of the intra-frequency/serving carrier(s), inter-frequency carriers and/or inter-RAT carriers configured for measurements by the old serving cell.

In a second example, it is assumed that Δ1≤Y where Y is the time during which inter-frequency receiver configurations are valid. In this case, cell detection on any of the inter-frequency configured by the last PCell may be prioritized over cell search that lacks any prior knowledge. This may also lead to that the candidate cells are detected faster and interference caused by pre-configured ProSe may be reduced. The inter-frequency cell detection is generally performed using measurement gaps. Typical length of measurement gap is 6 ms. However, a ProSe UE which is already out of network coverage may be able to perform cell detection using without gaps.

However the time to detect the inter-frequency cell can be based on or derived using certain measurement gap configuration e.g. based on measurement gap configuration #0, i.e. with no gaps. In some embodiments the UE can detect the inter-frequency cell within Y seconds e.g. if radio conditions are favorable such as SINR of the inter-frequency cell is above or equal to a threshold (e.g. −3 dB). However in some embodiments the UE can detect the inter-frequency cell within Y' seconds, where Y' is the duration starting from T2 i.e. just after duration Y. This may be the case when the UE starts detecting the inter-frequency cell at the end of the duration of Y or when the radio conditions of the inter-frequency cell are not very favorable such as SINR of the inter-frequency cell is below a threshold (e.g. −3 dB). In some embodiments the duration Y' may further be scaled with the total number of configured carriers ($N_{freq\_Y}$). Example of such scaling of the duration is: $Y'*N_{freq\_Y}$. Example of the total number of configured carriers ($N_{freq\_Y}$) is the sum of the inter-frequency carriers and/or inter-RAT carriers configured for measurements by the old serving cell. Example of the total number of configured carriers ($N_{freq\_Y}$) is the sum of the intra-frequency/serving carrier(s), inter-frequency carriers and/or inter-RAT carriers configured for measurements by the old serving cell.

A third example considers the case of an inter-RAT cell detection where Δ1<=Z s. It is assumed that Z is the time during which the old PCell configurations on inter-RAT carriers are valid. In this case, cell search with prior-knowledge of inter-RAT carriers or receiver configurations may be prioritized over cell search with no prior-knowledge. Similar to inter-frequency cell search procedure, the cell search procedure could be performed using no measurement gaps configuration #0 since the ProSe UE is already out of network coverage. In some embodiments the UE can detect the inter-RAT cell within Z seconds e.g. if radio conditions are favorable such as SINR of the inter-frequency cell is above or equal to a threshold (e.g. −3 dB). However in some embodiments the UE can detect the inter-RAT cell within Z' seconds, where Z' is the duration starting from T2 i.e. just after duration Z. This may be the case when the UE starts detecting the inter-RAT cell at the end of the duration of Z or when the radio conditions of the inter-RAT cell are not very favorable such as SINR of the inter-RAT cell is below a threshold (e.g. −3 dB). In some embodiments the duration Z' may further be scaled with the total number of configured carriers ($N_{freq\_Z}$). Example of such scaling of the duration is: $Y'*N_{freq\_Z}$. Example of the total number of configured carriers ($N_{freq\_Z}$) is the sum of the inter-frequency carriers and/or inter-RAT carriers configured for measurements by the old serving cell. Example of the total number of configured carriers ($N_{freq\_Z}$) is the sum of the intra-frequency/serving carrier(s), inter-frequency carriers and/or inter-RAT carriers configured for measurements by the old serving cell.

In some embodiments the scaling factors $N_{freq\_X}$, $N_{freq\_Y}$ and $N_{freq\_Z}$ may be the same i.e. $N_{freq}=N_{freq\_X}=N_{freq\_Y}=N_{freq\_Z}$.

Regardless of the newly detected cell type (intra-freq., inter-freq., inter-RAT, or any other carrier), the ProSe UE shall stop using the pre-configured ProSe resources as it detects a new cell which may belong to any of the old serving carrier(s), configured inter-frequency carrier(s) and configured inter-RAT carrier(s) by the last serving cell. This may result in that the new cell is not harmed or less subject to interference due to the pre-configured ProSe resources.

The UE in ONC may typically detect cells on old serving carrier(s), configured inter-frequency carrier(s) and configured inter-RAT carrier(s) in parallel or around the same time. For example over a duration Δ1=MAX(X,Y,Z), the UE may attempt to detect cells on old serving carrier(s), configured inter-frequency carrier(s) and configured inter-RAT carrier(s).

However in another exemplary embodiment the UE in ONC may detect cells on old serving carrier(s), configured inter-frequency carrier(s) and configured inter-RAT carrier(s) in serial order. Example of such order is detecting cells first on serving carrier, then on inter-frequency carriers if no cell is detected on serving carrier(s) and finally on inter-RAT carrier(s) if no cell is detected on inter-frequency carrier(s).

In yet another exemplary embodiment the UE in ONC may detect cells on old serving carrier(s), configured inter-frequency carrier(s) and configured inter-RAT carrier(s) according to pre-defined order e.g. first on old serving carrier then on inter-RAT carriers and finally on inter-RAT carriers.

In yet another exemplary embodiment the UE in ONC may typically detect cells on old serving carrier(s), configured inter-frequency carrier(s) and configured inter-RAT carrier(s) according to the order configured by the network node e.g. by the last serving cell.

Detection of new cells by ProSe UE in out of network coverage after measurement configurations expires is discussed in the following.

If the ProSe UE has been out-of-coverage for long time (e.g. more than 5 s) then the UE may not be able to "remember" the old receiver configurations or the configurations may not be valid any longer. In that case the cell search procedure becomes similar to initial cell search whose requirements are not specified in the standard. In this case, the ProSE UE may search for cells on all supported frequency bands i.e. within each band it will search cells. For example in LTE the UE may have to detect PSS/SSS in every 100 KHz (channel raster). If PSS/SSS is detected then it knows where the centre frequency is because PSS/SSS are transmitted in the centre frequency and it will align its frequency- and time-synchronization towards that new cell.

This embodiment considers the case when the ProSe UE has been out of network coverage for long time which has resulted in that the measurement configuration of the intra-frequency, the inter-frequency or the inter-RAT carriers have expired. When the configuration expires, the UE shall perform initial cell search for cells belonging to carriers of all its supported bands.

As an example, if the UE has been out of network coverage for a given time, e.g. $\Delta 1$ seconds, where $\Delta 1 > \text{MAX}(X,Y,Z)$, then the UE may choose to perform cell search on carriers of all its supported bands.

In another example, if the UE has been out of network coverage for $\Delta 1$ seconds, where $\Delta 1 > \text{MAX}(X, Y, Z)$, then the UE may choose to perform cell search of cells on carriers of one or specific set of supported bands i.e. perform initial cell search.

In yet another example, if the UE has been out of network coverage for $\Delta_{Total} = \Delta 1 + \Delta 2$ seconds, where $\Delta 1 > \text{MAX}(X, Y, Z)$ and $\Delta 2 > \text{MAX}(X', Y', Z')$, then the UE may choose to perform cell search of cells on carriers of one or specific set of supported bands.

In yet another example, if the UE has been out of network coverage for $\Delta 1 + \Delta 2$ seconds, where $\Delta 1 > \text{MAX}(X, Y, Z)$ and $\Delta 2 > \text{MAX}(X' *N_{freq\_X}, Y' *N_{freq\_Y}, Z' *N_{freq\_Z})$, then the UE may choose to perform cell search of cells on carriers of one or specific set of supported bands.

In yet another example, if the UE has been out of network coverage for $\Delta 1 + \Delta 2$ seconds, where $\Delta 1 > \text{MAX}(X, Y, Z)$ and $\Delta 2 > \text{MAX}(X', Y'*N_{freq\_Z}, Z'*N_{freq\_Z})$, then the UE may choose to perform cell search of cells on carriers of one or specific set of supported bands.

The specific set of bands whose carriers are searched for may be pre-defined, UE implementation specific or configured by the network node. The UE may detect first cells of certain RAT e.g. first LTE cells and if no LTE cell is detected then the UE may detect cells of other RATs such as UMTS. The order in which the UE should detect cells of different RATs after the duration $\Delta 1$ may also be pre-defined, UE implementation specific or configured by the network node.

In an another example, if the UE has been out of network coverage for $\Delta 1$ seconds, where $\Delta 1 >= X$ and $\Delta 1 >= Z$ but $\Delta 1 <= Y$, then the UE may perform cell search firstly on inter-frequency carriers using the measurement configurations configured at last PCell.

The duration $\Delta 1 = \text{MAX}(X, Y, Z)$ or $\Delta_{Total} = \Delta 1 + \Delta 2$ may also be called as a first phase of cell detection i.e. when UE attempts to detect a cell on any of the old serving carrier(s), configured inter-frequency or the configured inter-RAT carriers.

Where $\Delta 2 = \text{MAX}(X', Y', Z')$ or $\Delta 2 = \text{MAX}(X' *N_{freq\_X}, Y' *N_{freq\_Y}, Z'*N_{freq\_Z})$, The duration $\Delta 3$ which starts after the first phase may be called as a second phase of cell detection. During the second phase as stated above the UE detects the cell using initial cell search procedure on carriers of one or more supported bands of the UE.

The second phase of cell detection may further be scaled with the total number of carriers to search for in all bands where search is done by the UE e.g. $\Delta 3' = \Delta 3 * N_{carriers\_total}$) where $\Delta 3'$ is the scaled value of the second phase. The $N_{carriers\_total}$ may correspond to all carriers of all RATs searched by the UE for detecting a cell during the second phase.

Detection of cells by ProSe UE on configured carriers and non-configured carriers over partly overlapping time is discussed in the following.

In this embodiment the UE also first attempts to detect cells on any of the carriers configured by the UE's last PCell before the UE entered in ONC. If no cell is detected up to certain time in the first phase then the UE during the second phase starts the detection of cells on last configured carriers as well as non-configured carriers on all bands supported by the UE. The key difference is that in this embodiment, the UE treats the last configured carrier and non-configured carriers separately for cell detection during the second phase. These aspects are described in detail below.

The UE starts identifying a cell on at least one of the configured carriers (i.e. configured by the last PCell) upon entering into ONC. Examples of such carriers are last intra-frequency, carrier(s) whose sidelink(s) are configured for ProSe operation in ONC, last configured inter-frequency carriers and inter-RAT carriers. In some embodiment the last intra-frequency and carrier(s) whose sidelink(s) are configured for ProSe operation in ONC may be the same. However in some embodiment the last intra-frequency and carrier(s) whose sidelink(s) are configured for ProSe operation in ONC may be different. The UE is typically explicitly configured with the information about the configured carriers. For example the UE is configured with the carrier frequency channel number aka EARFCN. The UE may also be explicitly indicated whether a particular preconfigured carrier is using or will use D2D operation or not. For example an operator A may inform the UE about the carriers used for D2D operation in the operator B network. This will enable the UE to identify cells on the carrier(s) of the operator B when roaming into the operator B network coverage. The UE can then also use D2D resources for D2D operation in operator B network.

Typically the UE may start identifying a cell on all the configured carriers (e.g. at different time).

In some embodiment the UE may identify the cells on the last intra-frequency and the carrier preconfigured with D2D operation in ONC over the same time period i.e. identifying a cell by sharing the time resources between the two types of carriers. For example UE may identify a cell on one last intra-frequency and one carrier preconfigured with D2D operation within $2*$ Tintra_identify; where Tintra_identify time to identify a cell on intra-frequency carrier.

In some embodiment the UE may identify the cells on the configured inter-frequency carriers and the carrier preconfigured with D2D operation in ONC over the same time period i.e. identifying a cell by sharing the time resources between the two types of carriers. For example UE may identify a cell on one inter-frequency and one carrier pre-configured with D2D operation within 2* Tinter_identify; where Tinter_identify time to identify a cell on inter-frequency carrier.

The UE procedures related to this embodiment are summarized below. These procedures may be pre-defined and the UE has to comply to these rules.

Cell detection during the first phase:
  If the UE has been in ONC for not more than certain time period (Tmax, Tmax1 or X or T1+delta1, or T2, depending on the terminology used) (e.g. less than or equal to 5 seconds) and a cell on a configured carrier is detectable, then the UE may identify the cell within a first time period. A cell is considered detectable provided it meets the cell identification conditions. Examples of such conditions are the received signal quality and signal strength levels at the UE. As an example the first time period is the measurement period (Tperiod) of the measurement on the detectable cell e.g. 200 ms for RSRP/RSRQ measurement. In another example the first time period may be multiple of the basic measurement period e.g. 4*Tperiod. In another example the first time period may be multiple of the measurement period if the UE has to identify cells on multiple carriers e.g. 2*Tperiod if there are two configured carriers. Examples of signal quality and signal strengths related conditions for intra-frequency cells are SINR (e.g. −6 dB) and RSRP (e.g. −120 dBm) respectively.
  In some embodiment the UE may identify the cell during the first time period provided one or more additional conditions related to the cell to be identified are also met. Examples of such conditions are the change in the timing of the cell, frequency offset or change in the frequency of cell since it was last measured by the UE. For example the UE may identify the cell within the first time period provided the timing of the cell has not changed by more than ±50 Ts (Ts=32.5 ns) since it was last measured. In another example the UE may identify the cell within the first time period provided the carrier frequency of the cell has not changed by more than ±100 Hz since it was last measured.

Cell detection during the second phase:
  If the UE has been in ONC for more than certain time period (e.g. more than 5 seconds) and a cell on the configured carrier is detectable then the UE identifies the cell within a second time period. As an example the second time period is the cell identification time e.g. 800 ms for identification of the intra-frequency cell, about 3 seconds for identification of the inter-frequency cell etc. In another example the second time period may be multiple of cell identification time (Tidentify) e.g. 3*Tidentify. In yet another example the second time period may be multiple of Tidentify if the UE has to identify cells on multiple carriers e.g. 2*Tidentify for two configured carriers. In a preferred embodiment the first time period is shorter than the second time period. However in some embodiments they may be the same.
  Also in some embodiment the UE may identify the cell during the second time period provided one or more additional conditions related to the cell to be identified are also met. Examples of such conditions are the change in the timing of the cell, frequency offset or change in the frequency of cell since it was last measured by the UE. For example the UE may identify the cell within the second time period provided the timing of the cell has not changed by more than ±100 Ts (Ts=32.5 ns) since it was last measured. In another example the UE may identify the cell within the second time period provided the carrier frequency of the cell has not changed by more than ±200 Hz since it was last measured.

In some embodiments it may also be pre-defined that regardless of the time during which the UE has been in ONC and a cell on the configured carrier is detectable then the UE identifies the cell within a second time period. On this case the UE may identify the cell during the second time period provided one or more additional conditions related to the cell to be identified are also met as elaborated above.
  If the UE has been in ONC for more than certain time period (e.g. 6 seconds or more) and if the UE has not detected any cell on any configured carrier then the UE continue detecting the cell on the configured carrier(s) within the second time period. But in addition the UE also start identifying cells on non-configured carriers which belong to the bands supported by the UE. The non-configured carriers herein refer to the carriers which are not configured by the last PCell of the UE before it enters into the ONC. The UE may identify a cell on the non-configured carriers during a third time period. The third time period the UE may typically be longer than the first and the second time periods.
  If the UE identifies any cell on any of the configured carriers (e.g. intra-frequency carrier(s), carrier(s) configured with D2D operation in ONC, the configured inter-frequency carriers, the configured inter-RAT carriers etc) or any of the non-configured carriers belonging to the supported bands (i.e. during any of the first or second phases) then:
    the UE may stop using the preconfigured resources for ProSe operation on any of the carrier and
    the UE may also use resources assigned by the newly identified cell for ProSe operation on the slidelink on the carrier of the newly identified cell.

The above procedure is also described with an example:
Assume the UE currently in ONC was configured with:
  an intra-frequency whose sidelink was used for ProSe operation by the UE,
  one inter-frequency carrier and
  one inter-RAT carrier (e.g. UTRA FDD carrier).

The UE starts identifying cells on the intra-frequency, the inter-frequency carrier and the inter-RAT carrier when the UE enters in the ONC. If the UE is unable to detect any cell on any of the three carriers until a total duration of Tmax_total then the UE also starts identifying a cell on other carriers (i.e. non-configured carriers) belonging to the bands supported by the UE. If the UE detects cell on any of the configured or non-configured carriers then the UE stops using the preconfigured ProSe resources for ProSe operation. The UE may also acquire new set of ProSe resources for ProSe operation from the new cell if it supports ProSe operation. After acquiring new set of ProSe resources the UE may start using the ProSe resources for ProSe operation on the sidelink of the carrier for which the resources are assigned.

Where:
Tmax_total is function of Tmax1, Tmax2 and Tmax 3. Examples of function are maximum, minimum, average etc. As an example:

$$Tmax\_total = MAX(Tmax1, Tmax2, Tmax3)$$

Where:

Tmax1 is the duration over which the UE has not identified any cell on the intra-frequency carrier since in ONC (and/or a pre-defined time T2 after T1, the beginning of ONC) and beyond Tmax1 the UE can identify an intra-frequency cell during the second time period (e.g. over intra-frequency cell identification time). Example of Tmax1=6 seconds.

Tmax2 is the duration over which the UE has not identified any cell on the inter-frequency carrier since in ONC and beyond Tmax2 the UE can identify an inter-frequency cell during the second time period (e.g. over inter-frequency cell identification time). Example of Tmax2=5 seconds.

Tmax3 is the duration over which the UE has not identified any cell on the inter-frequency carrier since in ONC and beyond Tmax3 the UE can identify an inter-RAT cell during the second time period (e.g. over inter-frequency cell identification time). Example of Tmax3=4 seconds.

UE implementation aspects for cell search in ONC are discussed in the following.

Figure 3:
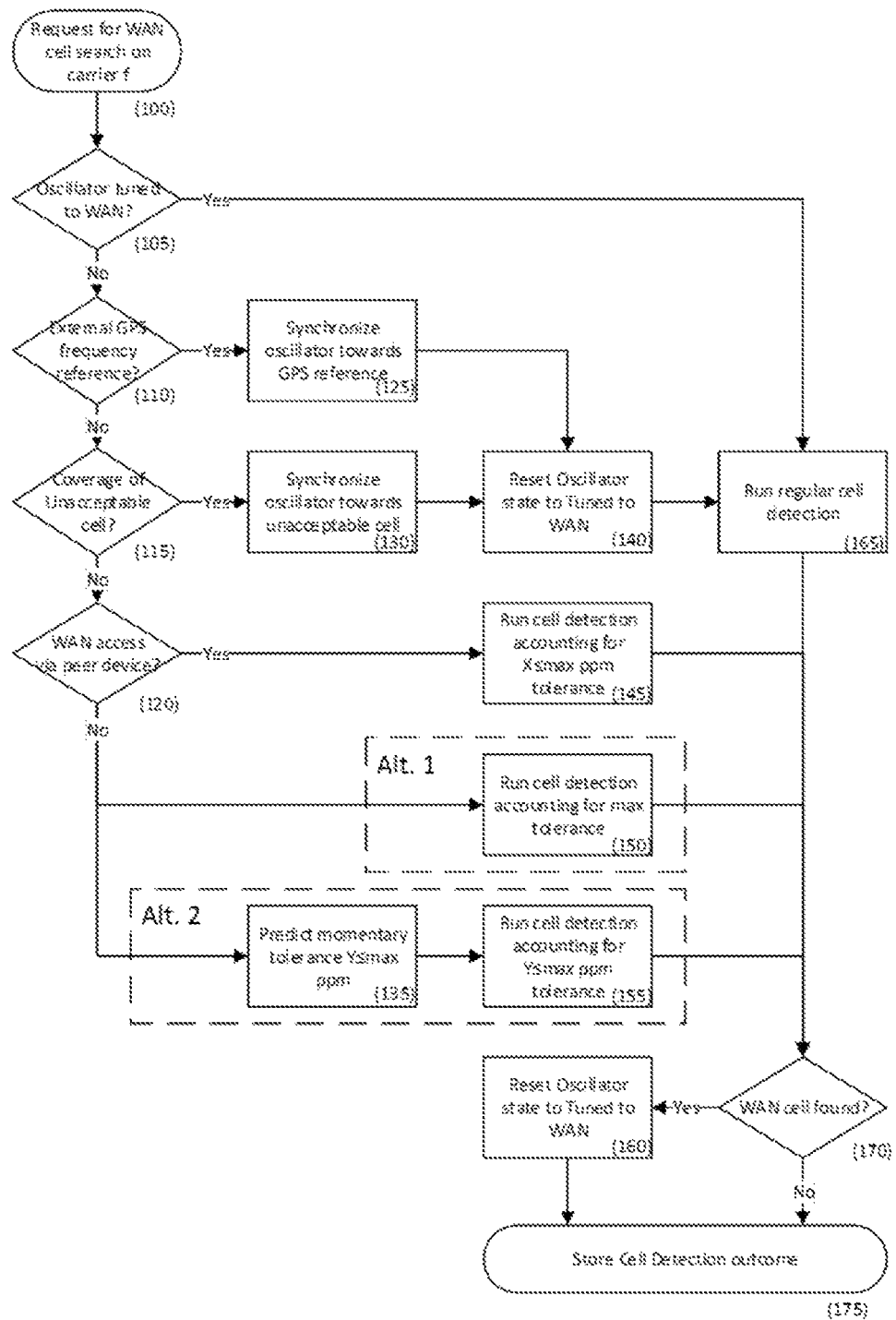
FIG. 3, showing an example of a UE handling of cell search in out-of-WAN coverage.
Figure 4:
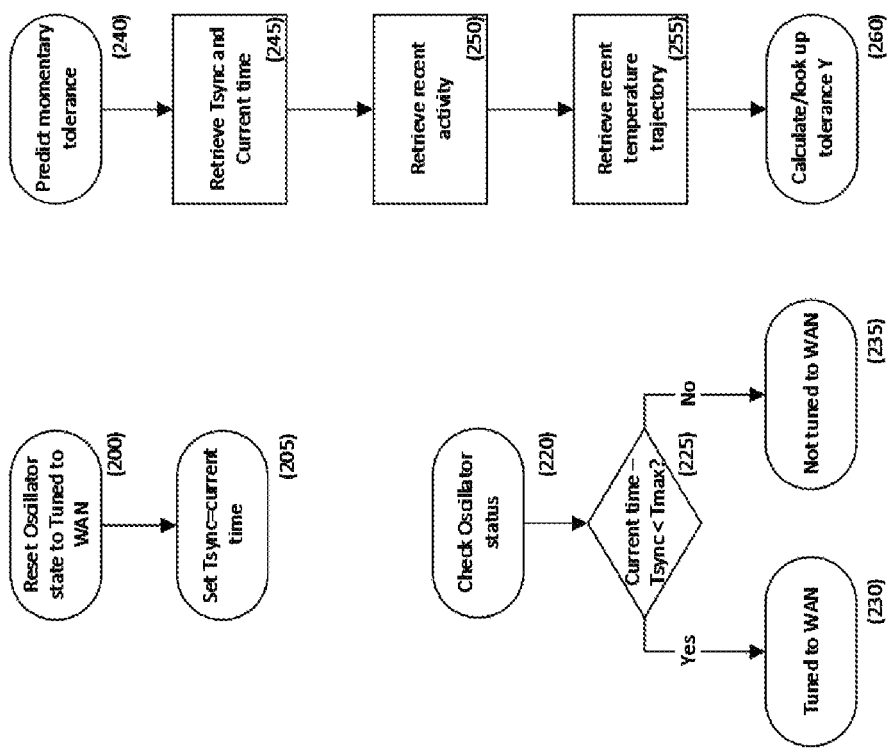
FIG. 4, showing an example of UE handling of Oscillator status with respect to out-of-WAN coverage.

Exemplary cell detection when out-of-WAN coverage is illustrated in FIGS. 3 and 4 and is further described below.

When it is time to carry out cell detection on a carrier frequency f (100), the UE first checks whether the modem still is synchronized to the network (105; Details in 220-235). In case network coverage was lost recently, e.g. within 15-30 s, the oscillator (XO, VCXO, TCXO) may still give sufficiently accurate frequency reference for cell detection to be carried out. If this is the case (105;YES) a regular cell detection is carried out, without taking oscillator drift into account (165). Concretely it is assumed that the absolute frequency offset is within the capture range for frequency offset estimation and hence in the range ±2 kHz.

In case it is assessed that the oscillator drift is too large for it to be used for cell detection (105;NO), the UE may check if an external frequency reference is available, for instance from a companion GPS circuit which may be active and has locked on satellites. If such frequency source is available (110;YES) the UE tunes the modem oscillator using the external reference (125), sets the oscillator status to Tuned to WAN (140; Details in 200-210), and then carries out a regular cell detection (165).

In case no external frequency reference is available (110; NO) the UE checks whether it is in the coverage of any unacceptable cell (e.g. of another operators network, or a cell that it for other reasons is not allowed to use). If so (115;YES) the UE tunes in to the carrier of the unacceptable cell to acquires synchronization (130). It then sets the oscillator status to Tuned to WAN (140; Details in 200-205), and carries out a regular cell detection (165).

In case no unacceptable cells have been encountered in previous searches since the UE went out of WAN coverage (115;NO), the UE checks whether it has connection to the WAN via a peer device (i.e. operating in D2D, ProSe). If so (120;YES), depending on the maximum number of devices that can form a link between the UE and WAN (which may be assumed, specified in standards, or signaled), the UE will have to account for a larger frequency tolerance, X ppm, than had it been directly connected to the network. The reason is that each link between the UE and the WAN adds to the tolerance hence the frequency experienced by a UE when receiving a signal from a peer device may have a larger tolerance to the nominal frequency than the allowed base station tolerance (i.e., ±0.01 ppm for LTE macro cell; 3GPP TS 36.101). The UE thus runs cell detection where it accounts for the potentially large frequency offset (145). Particularly, in case the absolute frequency offset can be assumed to be outside the range ±2 kHz, disambiguation of the frequency offset estimate may be needed, as outlined in U.S. Pat. No. 8,675,788 "Correction of frequency offsets greater than the Nyquist frequency". Moreover, if the maximum absolute frequency offset can exceed 3.75 kHz the UE may need to carry out a search over a frequency grid, as outlined in U.S. Pat. No. 8,447,005 "Frequency synchronization methods and apparatus", where the width of the search depends on carrier frequency f and tolerance X.

In case the UE does not have any established connection with a peer device (120;NO), in a first alternative (Alt.1) it runs cell detection assuming the maximum initial frequency tolerance as specified for the modem (150). This tolerance may be as high as 15-20 ppm due to imperfections, ambient temperature, and ageing. One cell detection approach for this case is outlined in U.S. Pat. No. 8,447,005 "Frequency synchronization methods and apparatus".

In another alternative (Alt.2) the UE may assess the worst case drift and a corresponding tolerance Y since last synchronization to the WAN (135; Details in 240-260). It then runs cell detection where it takes the tolerance Y into account (155)—similar to step (145) above.

When cell detection has been carried out, if a cell was detected on carrier frequency f (175;YES), the oscillator status is set to Tuned to WAN (160; Details in 200-205) and information about the cell is stored for later use (170;YES), e.g. SI acquisition and random access.

The oscillator's tuning status may be tracked e.g. by logging the time at which the last AFC correction was made while the UE was receiving successfully from the WAN (e.g. indicated by successful CRC check) (200, 205).

In its simplest form, the UE may assess the status of the oscillator by calculating how much time has elapsed since the last tuning (225). If the elapsed time is less than some Tmax (225;NO), the oscillator is considered to be untuned with respect to the WAN (235); otherwise it is assumed to be tuned (230). Tmax may be a conservative value for which the drift of the oscillator remains within an acceptable tolerance regardless of what activity level the UE had before going out of WAN coverage.

Several factors are impacting the oscillator drift, with aging and temperature changes as the dominating contributors. Aging can be discarded if only considering the drift that happens during the time since the last synchronization to WAN. Temperature changes depend on what activity the UE was involved in immediately before going out-of-WAN coverage and the activity after going out-of-WAN coverage. The UE can predict the maximum tolerance by taking the time since the last synchronization (245) and activities before and after going out-of-coverage (e.g. data call before and cell search after) as a proxy for the temperature change (250), and/or the actual temperature trajectory close to the crystal (when such measurements are supported). This information can be used for estimating the worst case tolerance at current time (260), thereby potentially reducing the number of frequency offset grid points when carrying out cell detection.

A method in a network node configuring a D2D enabled UE with carriers for cell detection in out of network coverage is discussed in the following.

In this variant the network node (e.g. providing the old serving cell of the D2D enabled UE) configures the D2D enabled UE with information related to detecting cells on serving carriers, configured inter-frequency and configured inter-frequency carriers when the D2D enabled UE would go into ONC. The network node may be configured accordingly and/or comprise a configuring module for such configuring.

The information may comprise of an indicator that the D2D enabled UE should detect cells on all carriers during the first phase i.e. serving carriers, configured inter-frequency and configured inter-frequency carriers in ONC. The information may also comprise of an indication that only a subset of serving carriers, configured inter-frequency and configured inter-frequency carriers should be used for detecting cells in ONC. In this case the information about the subset of carriers may also be provided to the UE. The information may also comprise of an indicator that only carriers or subset of carriers configured for measurements in a particular RRC state may be used for detecting cells in ONC e.g. those configured in RRC connected state. The information may also comprise of an indicator that all carriers or subset of carriers configured for measurements in all RRC states may be used for detecting cells in ONC e.g. those configured in RRC idle and RRC connected states.

The information may also comprise of list of frequency bands and/or carriers within certain bands on which the UE should detect cells in ONC if no cell is detected within the first phase e.g. carriers/bands on which to detect cells during the second phase of cell detection. The information may also comprise of RATs whose cells are to be searched by the UE during the second phase. The information may also comprise of order with which the UE should search cells on different RATs UE during the second phase.

Prior to configuring the UE with one or more set of the above information, the network node may determine (and/or the network node may be adapted accordingly and/or comprise a determining module for such determining) the information based on one or more of the following criteria or pre-defined knowledge:

Frequency bands used in a coverage area where UE may operate while in OCN;

Carrier frequencies within the identified bands used in a coverage area where UE may operate while in OCN;

RATs (e.g. LTE TDD, LTE FDD, UMTS, GSM etc) within the identified bands used in a coverage area where UE may operate while in OCN;

Capability of the UE in terms of supported bands;

Capability of the UE in terms of supported RATs on different bands supported by the UE.

For example the network node may configure the UE only those bands and RATs for cell search in the first and the second phases, which are available in the coverage area as well supported by the UE.

The network node can acquire information about the capability of the UE in terms of supported bands, RATs etc based on indication received from the UE.

According to the solution, the measurement configuration configured by the last PCell may be valid up to a certain time at the UE. This time may be different for different type of cell search configurations. By taking this time and measurement configuration configured by the last PCell into account at a ProSe UE which has been out of network coverage, the cell search procedure can be performed much faster. The cell detection for which the UE has prior-knowledge (e.g. measurement configurations) may be prioritized over others. In addition, the interference caused by the ProSe UE due to the pre-configured ProSe resources which the ProSe UE uses while operating in out of network coverage may be reduced. If the ProSe UE has been out of network coverage for long time (e.g. duration beyond a threshold) that the old measurement configurations are invalid or unreliable, then the UE may perform initial cell search procedure on all carriers of subset or all its supported bands.

There is generally described a UE adapted to carry out any of the methods for operating a UE described herein, in particular any of the method for cell search performed by a UE described herein. The UE generally may comprise a cell search module for performing cell search as described herein. It may be considered that the UE comprise a configuration checking module for checking a configuration of pre-determined times (e.g. T2 and/or T3, and/or any one or any one combination of Tmax(1,2,3,total) described herein).

Performing cell search may be performed based on the checking. Checking may include whether at a given time, a cell search according to a defined phase has provided a cell search identification, and/or which cell search operations (e.g. on which carriers) are to be performed at a given time, e.g. depending on pre-defined time thresholds and/or a remembered and/or stored configuration. There are also disclosed a corresponding program product and a corresponding storage medium.

Independently or in addition, there is described a method for operating a D2D enabled UE for a cellular communication network, comprising performing a cell search, which may be performed in an out of coverage (OOC or ONC) condition of the UE and/or after determining and/or detecting such a condition. There may be considered a user equipment adapted for such performing and/or comprising a cell search module for such performing. Performing a cell search may be based on a first measurement configuration during a first phase. Performing a cell search may be based on a second measurement configuration during a second phase, wherein the second phase may be different from the first phase, in particular longer than the first phase and/or, the second phase may begin when the first phase ends; and/or time thresholds defining the first phase and the second phase may be chosen and/or determined and/or configured accordingly.

Optionally, performing a cell search may be based additionally on a third measurement configuration during a third phase, wherein the third phase may be different from the first phase and/or the second phase, in particular longer than the first phase and/or the second phase, and/or the third phase may begin when the first phase and/or the second phase ends; and/or time thresholds defining the third phase, the first phase and the second phase may be chosen and/or determined and/or configured accordingly.

Performing a cell search may be interrupted during any of the phase/s if a cell has been identified using the measurement configuration associated to the respective phase. The method may comprise detecting an out of coverage condition, e.g. before performing the cell search. The user equipment may be adapted for such detecting and/or comprise a detecting module for such detecting. The method may comprise configuring the UE for the first measurement configuration based on allocation and/or configuration data received from a network and/or network node. The UE may be adapted for such configuring and/or for receiving such data, and/or may comprise a configuring module for such configuring and/or a receiving module for such receiving. The method and/or UE may in particular comprise any of the features of a method for operating a UE described herein and/or be adapted correspondingly.

There is also described a method for operating a network node, comprising configuring a D2D enabled UE with a first measurement configuration. There may be considered a network node adapted for such configuring and/or comprising a configuring module for such configuring. The method may comprise determining the first measurement configuration and/or a first time phase and/or a first time threshold, e.g. based on operating conditions.

The network node may be adapted for such determining and/or comprise a configuration determining module for such configuring. Configuring may comprise configuring the UE with a second measurement configuration and/or a second time phase and/or a second time threshold. Configuring may comprise configuring the UE with a third measurement configuration and/or a third time phase and/or a third time threshold. Configuring the UE may comprise transmitting allocation data and/or configuration data representing the first measurement configuration and/or the second measurement configuration and/or the third measurement configuration and/or the associated time phase/s and/or thresholds to the UE. The second phase may be different than the first phase, in particular longer than the first phase and/or the second phase may begin when the first phase ends and/or the time thresholds may be chosen and/or determined and/or configured accordingly.

The third phase may be different from the first phase and/or the second phase, in particular longer than the first phase and/or the second phase, and/or the third phase may begin when the first phase and/or the second phase ends; and/or time thresholds defining the third phase, the first phase and the second phase may be chosen and/or determined and/or configured accordingly.

The first measurement configuration and/or the second measurement configuration may, independently or in addition to any of the other features disclosed therein, in particular be defined as outlined in E1 to E6, corresponding to different types of cells.

Some embodiments described are:

E1. A method in a ProSe capable UE configured with a first ProSe configuration for a ProSE operation on first a side link and operating in out of network coverage (ONC), the method comprises:
Attempting to detect at least one first type of cell operating on a first type of carrier configured with a first measurement configuration during a first maximum time period, $\Delta\tau_1$;
Where $\Delta\tau_1 = T2-T1$, is the duration over which the UE is able to use the first measurement configuration for detecting the first cell;
T1 is a time instance when the UE moves into ONC.
Attempting to detect at least one second type of cell operating on a second type of carrier configured with a second measurement configuration, provided that none of the first type of cell is detected within a third maximum time period, $\Delta\tau_3$;
Where $\Delta\tau_3 = \Delta\tau_1 + \Delta\tau_2$; and is $\Delta\tau_2$ a second maximum time period over which the UE can identify the first cell.
Adapting one or more ProSe operations based on the detection of the at least one first type of cell or the second type of cell.

E2 (Independent or according to E1) A method in a ProSe capable UE configured with a first ProSe configuration for a ProSE operation on first a side link and operating in out of network coverage (ONC), the method comprises:
Attempting to detect at least one first type of cell operating on a first type of carrier configured with a first measurement configuration starting from time T1 which is a time instance when the UE moves into ONC.
Attempting to detect at least one second type of cell operating on a second type of carrier configured with a second measurement configuration, provided that none of the first type of cell is detected within a maximum time period, $\Delta\tau'$;
Where $\Delta\tau'$ and is the time period over which the UE has not identified any first type of the cell on the first type of carrier since entering in ONC and beyond which the UE can identify the first type of cell during a second time period (e.g. over cell identification time of the first type of cell).
Adapting one or more ProSe operations based on the detection of the at least one first type of cell or the second type of cell.

E3. The method of E1 or E2, wherein the first type of cell may belonging to any one or any combination of:
an intra-frequency or serving carrier used by the UE before entering in the ONC;
a carrier frequency whose sidelink is preconfigured with ProSe resources for ProSe operation of the UE in ONC;
a carrier frequency of the side link or a carrier frequency associated with the carrier frequency of the first side link;
an inter-frequency carrier configured by the last serving cell for one or more inter-frequency measurements;
an inter-RAT carrier configured by the last serving cell for one or more inter-RAT measurements. This definition of the first type is applicable for any embodiment or variant, e.g. any method for operating a UE, described in this specification.

E4. The method of one of E1 to E3, wherein the second type of cell may belonging to any of:
an inter-frequency carrier belonging to any of a frequency band supported by the UE, regardless of whether said carrier is configured or not for the inter-frequency measurement;
an inter-RAT carrier belonging to any of a frequency band supported by the UE, regardless of whether said carrier is configured or not for the inter-RAT measurement. This definition of the second type is applicable for any embodiment or variant, e.g. any method for operating a UE, described in this specification.

E5. The method of one of E1 to E4, wherein the first measurement configuration comprises:
Information about at least one intra-frequency carrier and may further comprise of one or more non-carrier carriers, said information is received from the last serving cell;
Timing information about one or more or more cells operating on one or more second type of carriers. This definition of the first measurement configuration is applicable for any embodiment or variant, e.g. any method for operating a UE, described in this specification.

E6. The method of one of E1 to E5, wherein the second measurement configuration comprises:
Information about carriers of at least one frequency band supported by the UE, said information is retrieved from pre-defined or stored information. This definition of the second measurement configuration is applicable for any embodiment or variant, e.g. any method for operating a UE, described in this specification.

E7. The method of one of E1 to E6, wherein adapting the ProSe operation comprises:
Stopping the ProSe operation on the first side link if at least one cell belonging to the first or the second types of cells is detected by the UE E8. The method of any one of E1 to E7, wherein adapting the ProSe operation, further comprises:

Receiving a second ProSe configuration for the ProSe operation on a second side link from the detected cell; and Performing ProSe operation using the second ProSe configuration on the second side link or not performing any ProSe operation if no second ProSe configuration is received from the detected cell.

E9. The method of one of E1 to E8, wherein the cell of the first cell type can be detected within $\Delta\tau_3 = \Delta\tau_1$ i.e. $\Delta\tau_2 = 0$.

E10. The method of one of E1 to E9, wherein $\Delta\tau_1 = \text{MAX}$ (X, Y, Z), where X, Y and Z are time periods over which the first measurement configuration can be used for detecting cells on intra-frequency carrier(s) used before entering ONC, configured inter-frequency carrier(s) and configured inter-RAT carrier (s) for measurements by the last serving cell respectively.

E11. The method of one of E1 to E10, wherein $\Delta\tau_2 = \text{MAX}$ (X', Y', Z'), where X', Y' and Z' are time periods over which the UE can detect cell on intra-frequency carrier(s) used before entering ONC, on configured inter-frequency carrier(s) and on configured inter-RAT carrier (s) for measurements by the last serving cell respectively.

E12. The method of one of E1 to E11, wherein $\Delta\tau_2 = \text{MAX}$ (X', Y' $*N_{freq}$, Z' $*N_{freq}$), where $N_{freq}$ is the configured number of inter-frequency carrier(s) and inter-RAT carrier (s) for measurements by the last serving cell respectively.

N1. A method in a network node serving a ProSe capable UE configured with a first ProSe configuration for a ProSE operation on first a side link, the method comprises:

Determining a first measurement configuration to be used by the UE for detecting at least one first type of cell operating on a first type of carrier and operating in out of network coverage (ONC) during a first maximum time period, $\Delta\tau_1$;

Where $\Delta\tau_1 = T2 - T1$, is the duration over which the UE is able to use the first measurement configuration for detecting the first cell;

T1 is a time instance when the UE moves into ONC.

Determining a second measurement configuration to be used by the UE for detecting at least one second type of cell operating on a second type of carrier, provided that none of the first type of cell is detected within a third maximum time period, $\Delta\tau_3$;

Where $\Delta\tau_3 = \Delta\tau_1 + \Delta\tau_2$; and is $\Delta\tau_2$ a second maximum time period over which the UE can identify the first cell.

Transmitting the determined first measurement configuration and the second measurement configuration to the UE.

N2 The method of N1, where the first and/or the second measurement configurations are determined based on one or more of the following criteria:

Frequency bands used in a coverage area where UE may operate while in OCN;

Carrier frequencies within the identified bands used in a coverage area where UE may operate while in OCN;

RATs (e.g. LTE TDD, LTE FDD, UMTS, GSM etc) within the identified bands used in a coverage area where UE may operate while in OCN;

Capability of the UE in terms of supported bands;

Capability of the UE in terms of supported RATs on different bands supported by the UE.

Alternatively or additionally, there is disclosed for consideration the following suggested clause, which is a suggested amendment to 3GPP TS36.133 V12.6.0 and has to be read in the context thereof.

Cell Identification Requirements for ProSe UE in Any Cell Selection State 11.3.1 Introduction This clause contains requirements on the UE capable of ProSe direct communication regarding cell detection in any cell selection state.

The UE can be preconfigured with ProSe resources for ProSe operation in any cell selection state.

The requirements in this section are applicable for the ProSe in any cell selection state. The ProSe UE in any cell selection state (and/or in a ONC condition, which may be a condition of cell selection state) shall continuously search (e.g., according to the above and/or corresponding measurement configurations) for any detectable cell belonging to:

the last intra-frequency carrier, the carrier frequency preconfigured with ProSe resources for ProSe operation in any cell selection state, the carrier frequencies configured for inter-frequency and/or inter-RAT measurements by the last PCell and the carriers not configured by the last PCell but belong to the frequency bands supported by the UE.

11.3.2 Cell Identification Requirements 11.3.2.1 Identification of Cells on Intra-Frequency Carrier or Carrier Preconfigured with ProSe resources The UE capable of ProSe direct communication immediately upon entering in any cell selection state shall search for any detectable cell on intra-frequency carrier belonging to the last PCell or the carrier preconfigured with ProSe resources, e.g. according to a first measurement configuration and/or during a first phase.

An intra-frequency cell or a cell on the carrier preconfigured with ProSe resources is considered detectable provided it meets the intra-frequency cell identification conditions specified in section 8.1.2.2.

If the following condition is met then the UE shall be capable of identifying a detectable cell on the last intra-frequency carrier or on the carrier preconfigured with ProSe resources within $2*T_{Measurement\_Period,\ Intra}$, which is defined in clause 8.1.2.2:

The ProSe UE has been in any cell selection state within a time period, T1, where T1≤[5] seconds.

Otherwise the UE shall be capable of identifying a detectable cell on the last intra-frequency carrier or on the carrier preconfigured with ProSe resources within $2*T_{identify\_intra}$, which is defined in clause 8.1.2.2.

11.3.2.2 Identification of Cells on Inter-Frequency Carriers

The UE capable of ProSe direct communication immediately upon entering in any cell selection state shall search for any detectable cell on inter-frequency carriers configured for measurements by the last PCell (e.g., according to a second measurement configuration and/or to a second phase).

An inter-frequency cell is considered detectable provided it meets the inter-frequency cell identification conditions specified in section 8.1.2.3.

If the following condition is met then the UE shall be capable of identifying a detectable cell on any of the last configured inter-frequency carrier within $T_{Measurement\_Period,\ Inter}$ corresponding to gap id #0 as defined in clause 8.1.2.3:

The ProSe UE has been in any cell selection state within a time period, T2, where T2≤[5] seconds.

Otherwise the UE shall be capable of identifying a detectable cell on any of the last configured inter-frequency carrier within $T_{identify\_inter}$ corresponding to gap id #0 as defined in clause 8.1.2.3.

11.3.2.3 Identification of Cells on Inter-RAT Carriers

The UE capable of ProSe direct communication immediately upon entering in any cell selection state shall search for any detectable cell on inter-RAT carriers configured for measurements by the last PCell (e.g. according to a third measurement configuration and/or a third phase).

An inter-RAT cell is considered detectable provided it meets the inter-RAT cell identification conditions for the relevant RAT as specified in section 8.1.2.4.

If the following condition is met then the UE shall be capable of identifying a detectable cell on any of the last configured inter-RAT carrier within $T_{Measurement\_RAT}$ corresponding to gap id #0:

The ProSe UE has been in any cell selection state within a time period, T3, where T3≤[5] seconds.

Otherwise the UE shall be capable of identifying a detectable cell on any of the last configured inter-RAT carrier within $T_{identify,\ RAT}$ corresponding to gap id #0. Where, $T_{Measurement\_RAT}$ and $T_{identify,\ RAT}$ are the measurement period and cell identification time respectively for the relevent RAT as defined in clause 8.1.2.4.

11.3.2.4 Identification of Cells on Non-Configured Carriers

The UE capable of ProSe direct communication shall also search for any detectable cell on carriers, which are not configured by the last PCell but belong to the frequency bands supported by the UE provided the following condition is met:

The UE has not identified any cell on any of the last intra-frequency carrier, the carrier preconfigured with ProSe resources, the configured inter-frequency carriers and the configured inter-RAT carriers within the duration of MAX (T1, T2, T3).

11.3.3 ProSe UE Procedure Upon the Cell Identification

If the UE has identified any cell on any of the intra-frequency carrier, the carrier preconfigured with ProSe resources, the configured inter-frequency carriers, the configured inter-RAT carriers and the non-configured carriers belonging to the supported bands then:

the UE shall stop using the preconfigured resources for ProSe operation by the last PCell and the UE may use resources assigned by the newly identified cell for ProSe operation on the slidelink on the carrier of the newly identified cell.

The UE and/or the network node may be adapted accordingly.

Alternatively or additionally, there is disclosed for consideration:

1. Prose UE in Out-Of-Coverage

A ProSe UE which is out-of-coverage is required to scan for new cellular cells that it can connect to. The ProSe UE can be out-of-coverage for different periods, and the length of this period affects the total cell search delay. For example, if the ProSe UE has been out-of-coverage for very short time and it detects a cellular cell, then some of the old configurations may still be valid, e.g. frequency- and time synchronization.

On the contrary, if the ProSe UE has been out-of-coverage for long time, the frequency- and time synchronization may have changed or the old configurations may not be valid any longer. This may lead to longer cell search time. There should be a time, Δ, up to which the ProSe UE remembers its old receiver configuration.

Examples of such configurations (in particular corresponding to a measurement configuration, which may be a first measurement configuration) are:

Time and frequency configuration
Intra-band center-frequency location
Supported band configuration Remembering these receiver configurations will lead to reduced cell search time up to a certain time. This may correspond to a neighbour cell search procedure and it may be possible to reuse some of the existing cell search requirements in this case.

The second case is when the UE has been out-of-coverage for long time, e.g. more than X seconds that the UE has lost its old receiver configuration. This may correspond to an initial cell search procedure which will take even longer time, e.g. few seconds or minutes in the worst case.

Examples of pre-configured parameters that are configured for out-of-coverage scenarios are:

P-Max-ProSe; parameter used to limit the maximum transmit power when the ProSe UE operates in out-of-coverage.

additionalSpectrumEmissions-ProSe; parameter used to adjust the transmission to meet the region-specific regulatory emission requirements when ProSe UE operates in out-of-coverage.

The problem may arise due to the pre-configured ProSe resources when it is in the vicinity of a new cellular cell or when it detects a new cell on the cellular carrier. This is explained below.

When the ProSe UE is camped on a cell or it has a serving cell (PCell), then the ProSe UE should use the radio resources indicated by its PCell. These are indicated by the eNB using the SIB or dedicated signaling. If ProSe UE continues to use the pre-configured radio resources which were derived particularly for the out-of-coverage scenario in in-coverage scenario, this may result in that the ProSe harming the cellular network. Therefore there is a need for UE requirements to ensure that in out of network coverage the UE uses ProSe only where it is allowed to do so.

The newly detected cell by ProSe may be of following types:

intra-frequency cells (same carrier as that of the last serving cell)

cells on a carrier preconfigured with ProSe resources for ProSe operation in out of network coverage. This carrier can be the same or different than the last intra-frequency carrier.

inter-frequency cells inter-RAT cells

FIG. 1 shows a ProSe UE which has lost coverage to old cell, while being out of network coverage performing ProSe Communication with another ProSe UE using the pre-configured ProSe resources.

2. Cell Detection Requirements for Prose UE in Out-Of Coverage

In this section the time required for the ProSe UE in out-of-coverage to detect a cell on intra-frequency, configured inter-frequency or configured inter-RAT carriers or any non-configured carrier is discussed.

2.1 Detection of Intra-Frequency Cells or Cells on Pre-configured ProSe Carrier by ProSe UE in Out-of Coverage In this section it is assumed that the newly detected cell is an intra-frequency cell on the last intra-frequency carrier before entering ONC or the detected cell may belong to the carrier preconfigured with ProSe resources for ProSe operation in out of network coverage. The preconfigured ProSE carrier can be the same or different than the last intra-frequency carrier.

The detected cell can be the same old serving cell ProSe UE was connected to earlier or it can also be a new cell on any of the two carriers. In order to detect the new cell, the UE receiver has to first find the location of center frequency and then detect the PSS/SSS in 6 RBs located in the center frequency. For intra-frequency cells the center-frequency is located in the same position regardless of the band. Thus the new cell is detected quicker provided that the old measurement configuration is kept within the UE at this point in time, i.e. the old receiver configurations are still applicable. If this is the case, in our view the existing cell identification requirement can be reused for ProSe UE.

FIG. 2 illustrates the events in a time-axis of a ProSe UE in an example scenario. At time T1, the UE loses its connection to PCell, i.e. it goes out of network coverage. T2 is the point in time when the UE loses its old receiver configuration or at which the old receiver configurations become invalid. If the UE has been out-of-coverage for long time, e.g. time greater than $\Delta 1$, that the old measurement configuration is not valid or lost, then the cell search procedure may take longer time and it may correspond to initial cell search procedure.

This scenario can be compared to a HO (handover) scenario wherein the UE loses its connection to the old PCell for a short time. It this clause, a cell which has been unknown requires time to perform cell search. However, if the cell has been known for the last 5 seconds, then the cell may still be known at the UE since the center frequency is known. In this case the UE does only have to perform a measurement. In addition to the intra-frequency cell search, if the UE has to perform search on carrier preconfigured with ProSe resources the total cell time needs to be scaled up by multiplying the intra-frequency cell search time with a factor of 2. This is because the UE will have to share its cell search resources for detecting the cell on up to two carriers in parallel. In case the preconfigured ProSe carrier is the same as the last intra-frequency carrier then the UE can detect the new cell over short time. But it is suggested to define one set of requirements applicable to both cases i.e. use scaling factor of 2.

An intra-frequency cell or a cell on the carrier preconfigured with ProSe resources is considered detectable provided it meets the intra-frequency cell identification conditions specified according to the standard.

Proposal #1: The ProSe UE in out-of-coverage shall continuously search for any detectable cell on the last intra-frequency carrier.

Proposal #2: A ProSe UE which has been out-of-coverage for a time less than $\Delta 1$, where $\Delta 1 \leq [5]$ s shall be capable of identifying a detectable cell on the last intra-frequency carrier or on the carrier preconfigured with ProSe resources within $2*T_{Measurement\_Period,\ Intra}$ which is defined in clause 8.1.2.2.

Proposal #3: If the ProSe UE has been out-of-coverage for a time greater than $\Delta 1$, where $\Delta 1 > [5]$ s, then the UE shall be capable of identifying a detectable cell on the last intra-frequency carrier on the carrier preconfigured with ProSe resources within $2*T_{identify\_intra}$.

Regardless of what cell on intra-frequency or preconfigured ProSe carrier is detected, the ProSe UE shall stop using the pre-configured ProSe resources as it detects a new cellular cell. ProSe UE shall instead use the assigned radio resources by the new cell if it supports ProSe else it shall not use ProSe if ProSe is not supported in the new cell.

2.2 Detection of Inter-Frequency Cells by ProSe UE in Out-of Coverage

If the ProSe UE was configured with inter-frequency carriers for measurements by the old PCell then in out of coverage the UE should also continue searching inter-frequency cells on the previously configured inter-frequency carriers.

Similar to the discussion in previous section, if the ProSe UE has some prior knowledge about e.g. supported bands, center-frequency location etc. the new inter-frequency cell can be detected much faster. The UE may be able to keep some prior knowledge up to certain time, e.g. up to time T2 in FIG. 2.

In this case, the procedure becomes similar to neighbour cell search and then the existing requirement for inter-frequency cell search can be reused [36.133]. The difference, however, is that the UE performs neighbour cell search on inter-frequency cells using measurement gaps. Typically, measurement gaps of 6 ms every 40 ms are used for inter-frequency cell detection. It is notable that a ProSe UE which is already in out-of-coverage may be able to detect the new cell even quicker since it does not require any measurement gaps, i.e. it can search any time.

An inter-frequency cell is considered detectable provided it meets the inter-frequency cell identification conditions specified according to the standard.

Proposal #4: The ProSe UE in out-of-coverage shall continuously search for any detectable cell on inter-frequency carriers configured by the last PCell.

Proposal #5: A ProSe UE which has been out-of-coverage for a time less than $\Delta 1$, where $\Delta 1 \leq [5]$ s shall be capable of identifying a detectable cell on the last configured inter-frequency carrier corresponding to gap id #0 within as $T_{Measurement\_Period,\ Inter}$ which is defined in clause 8.1.2.3.

Proposal #6: If the ProSe UE has been out-of-coverage for a time greater than $\Delta 1$, where $\Delta 1 > [5]$ s, then the UE shall be capable of identifying a detectable cell on the last configured inter-frequency carrier within $T_{identify\_inter}$ corresponding to gap id #0 as defined in the standard.

Whenever inter-frequency is detected, the ProSe UE shall stop using the pre-configured ProSe resources as it detects a new cellular cell on any inter-frequency carrier. ProSe UE shall instead use the assigned radio resources by the new cell if it supports ProSe else it shall not use ProSe if ProSe is not supported in the new cell.

3.3 Detection of Inter-RAT Cells by ProSe UE in Out-of Coverage

If the ProSE UE was configured with inter-RAT carriers for measurements by the old PCell then in out of coverage the UE should also continue searching inter-RAT cells on the previously configured inter-RAT carriers.

In this case the detected cell belongs to different RAT. Existing inter-RAT cell detection requirements defined in the standard (Inter RAT measurements) [TS 36.133] can also be reused provided that the UE has been in out of coverage for not more than $\Delta 3$. The neighbour cell search on inter-RAT cells is performed using measurement gaps. Typically, measurement gaps of 6 ms every 40 ms are used for inter-frequency cell detection.

An inter-RAT cell is considered detectable provided it meets the inter-RAT cell identification conditions for the relevant RAT as specified in the standard.

Assuming that a ProSe UE has been out of network coverage during time $\Delta 1$, where $\Delta 1 <= [5]$ s, then the ProSe UE is able to detect inter-RAT cell on any of the configured inter-RAT carriers within the inter-RAT cell detection time defined for measurement gaps configuration #0 in section 8.1.2.3 (E-UTRAN inter frequency measurements) in [36.133].

Proposal #7: A ProSe UE which has been out-of-coverage for a time less than $\Delta 1$, where $\Delta 1 \leq [5]$ s shall be capable of identifying a detectable cell on any of the last configured inter-RAT carrier corresponding to gap id #0 within $T_{Measurement\_Period,\ RAT}$ which as defined in the standard.

Proposal #8: If the ProSe UE has been out-of-coverage for a time greater than Δ1, where Δ1>[5] s, then the UE shall be capable of identifying a detectable cell on any of the last configured inter-RAT carrier within $T_{identify\_RAT}$ corresponding to gap id #0 as defined in the standard.

Whenever inter-RAT is detected, the ProSe UE shall stop using the pre-configured ProSe resources as it detects a new cellular cell on any inter-RAT carrier. ProSe UE shall instead use the assigned radio resources by the new cell if it supports ProSe else it shall not use ProSe if ProSe is not supported in the new cell.

3.4 Detection of Cells by ProSe UE in Out-of Coverage after Measurement Configuration Expires This section pertains to a ProSe UE performing cell search on all supported carriers by the UE, i.e. not only the carriers which were configured for measurements by the last PCell. In this case, the ProSE UE has to search for cells on all supported frequency bands i.e. within each band it will search cells. For example in LTE the UE may have to detect PSS/SSS in every 100 KHz (channel raster). If PSS/SSS is detected then it knows where the center frequency is because PSS/SSS are transmitted in the center frequency and it will align its frequency- and time-synchronization towards that new cell. This corresponds to the initial cell search procedure and therefore requires no requirements.

Proposal #9: The ProSe UE in out of coverage shall search for any detectable cells on all supported carriers by the UE. However in this case no cell search requirements are specified.

If any cell is detected as part of the initial cell search then the ProSe UE shall stop using the pre-configured ProSe resources. The ProSe UE shall instead use the assigned radio resources by the new cell if it supports ProSe otherwise it shall not use ProSe if ProSe is not supported in the new cell.

3.5 Overall Requirements for Cell Detection by ProSe UE in Out-of Coverage

As stated above that it is important that the pre-configured ProSe resources are only used when the UE is out of network coverage. But as soon as the ProSe UE detect any cell while being in out of network coverage, the ProSe UE should stop using the pre-configured resources in order to not harm or to reduce its negative impact on the that new cell. Therefore it is necessary that any new detectable cell is identified by the UE as quickly as possible.

The overall ProSe UE procedure for detecting a cell and stopping the use of pre-configured resources for ProSe operation when the ProSe UE is in out of network coverage is as follows:

The ProSe UE upon entering in out of network coverage at time T1 shall continuously detect cells belonging to:
the intra-frequency of the last PCell or on the carrier preconfigured with ProSe resources,
the inter-frequency carriers configured for measurements by the last PCell for gap Id #0 defined in the standard,
the inter-RAT carriers configured for measurements by the last PCell for gap Id #0 defined in the standard.
If the UE is unable to detect any cell on the intra-frequency or carrier configured with ProSe resources, the configured inter-frequency or the configured inter-RAT carriers by the last PCell, then the UE shall also continuously detect cells on carriers of all frequency bands supported by the UE.
If the UE is able to detect any cell on the intra-frequency- or ProSe configured carrier, the configured inter-frequency or the configured inter-RAT carriers or on any other carrier, then the UE shall stop using resources for ProSe pre-configured by the last PCell.
If the newly detected cell supports ProSe then the UE may use radio resources assigned by the new cell for ProSe operation.

3

Cell detection of ProSe UEs in out of network coverage scenario has been discussed in the context of the current LTE standard. There are proposed ProSe UE procedures for pre-configured ProSe resources upon cell identification and requirements on time for cell detection that may belong to the intra-frequency- or ProSe configured carrier, the configured inter-frequency or the configured inter-RAT carriers or on any other carrier. A main objective of this discussion can be summarized as follows:

The ProSe UE upon entering in out of network coverage at time T1 shall continuously detect cells belonging to:
the intra-frequency of the last PCell or on the carrier preconfigured with ProSe resources,
the inter-frequency carriers configured for measurements by the last PCell for gap Id #0 defined in the standard,
the inter-RAT carriers configured for measurements by the last PCell for gap Id #0 defined in the standard.
If the UE is unable to detect any cell on the intra-frequency or carrier configured with ProSe resources, the configured inter-frequency or the configured inter-RAT carriers by the last PCell, then the UE shall also continuously detect cells on carriers of all frequency bands supported by the UE.
If the UE is able to detect any cell on the intra-frequency- or ProSe configured carrier, the configured inter-frequency or the configured inter-RAT carriers or on any other carrier, then the UE shall stop using resources for ProSe pre-configured by the last PCell.
If the newly detected cell supports ProSe then the UE may use radio resources assigned by the new cell for ProSe operation.

Some useful abbreviations are:

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may involve one or more than one terminal connected to a wireless communication network and/or more than one node of a wireless communication network and/or in a wireless communication network. It may be envisioned that a node in or for communication, and/or in, of or for a wireless communication network is adapted for communication utilizing one or more RATs, in particular LTE/E-UTRA.

A communication may generally involve transmitting and/or receiving messages, in particular in the form of packet data. A message or packet may comprise control and/or configuration data and/or payload data and/or represent and/or comprise a batch of physical layer transmissions. Control and/or configuration data may refer to data pertaining to the process of communication and/or nodes and/or terminals of the communication. It may, e.g., include address data referring to a node or terminal of the communication and/or data pertaining to the transmission mode and/or spectral configuration and/or frequency and/or coding and/or timing and/or bandwidth as data pertaining to the process of communication or transmission, e.g. in a header. Each node or terminal involved in communication may comprise radio circuitry and/or control circuitry and/or antenna circuitry, which may be arranged to utilize and/or implement one or more than one radio access technologies.

Radio circuitry of a node or terminal may generally be adapted for the transmission and/or reception of radio waves, and in particular may comprise a corresponding transmitter and/or receiver and/or transceiver, which may be connected or connectable to antenna circuitry and/or control circuitry. Control circuitry of a node or terminal may comprise a controller and/or memory arranged to be accessible for the controller for read and/or write access. The controller may be arranged to control the communication and/or the radio circuitry and/or provide additional services. Circuitry of a node or terminal, in particular control circuitry, e.g. a controller, may be programmed to provide the functionality described herein. A corresponding program code may be stored in an associated memory and/or storage medium and/or be hardwired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry. Radio access technology may generally comprise, e.g., Bluetooth and/or Wifi and/or WIMAX and/or cdma2000 and/or GERAN and/or UTRAN and/or in particular E-Utran and/or LTE. A communication may in particular comprise a physical layer (PHY) transmission and/or reception, onto which logical channels and/or logical transmission and/or receptions may be imprinted or layered.

A node of a wireless communication network may be implemented as a terminal and/or user equipment and/or network node and/or base station (e.g. eNodeB) and/or relay node and/or any device generally adapted for communication in a wireless communication network, in particular cellular communication.

A wireless communication network or cellular network may comprise a network node, in particular a radio network node, which may be connected or connectable to a core network, e.g. a core network with an evolved network core, e.g. according to LTE. A network node may e.g. be a base station. The connection between the network node and the core network/network core may be at least partly based on a cable/landline connection. Operation and/or communication and/or exchange of signals involving part of the core network, in particular layers above a base station or eNB, and/or via a predefined cell structure provided by a base station or eNB, may be considered to be of cellular nature or be called cellular operation.

A terminal may be implemented as a user equipment; it may generally be considered that a terminal is adapted to provide and/or define an end point of a wireless communication and/or for a wireless communication network. A terminal or a user equipment (UE) may generally be a device configured for wireless device-to-device communication and/or a terminal for a wireless and/or cellular network, in particular a mobile terminal, for example a mobile phone, smart phone, tablet, PDA, etc. A user equipment or terminal may be a node of or for a wireless communication network as described herein, e.g. if it takes over some control and/or relay functionality for another terminal or node. It may be envisioned that terminal or user equipment is adapted for one or more RATs, in particular LTE/E-UTRA. It may be considered that a terminal or user equipment comprises radio circuitry and/or control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. It may be considered that a terminal or user equipment is configured to be a terminal or user equipment adapted for LTE/E-UTRAN. Generally, a terminal may be adapted to support dual connectivity. It may comprise two independently operable transmitter (or transceiver) circuitries and/or two independently operable receiver circuitries; for dual connectivity, it may be adapted to utilize one transmitter (and/or receiver or transceiver, if provided) for communication with a master network node and one transmitter (and/or receiver or transceiver, if provided) for communication with a secondary network node. It may be considered that a terminal comprises more than two such independently operable circuitries.

A network node or base station, e.g. an eNodeB, may be any kind of base station of a wireless and/or cellular network adapted to serve one or more terminals or user equipments. It may be considered that a base station is a node or network node of a wireless communication network. A network node or base station may be adapted to provide and/or define and/or to serve one or more cells of the network and/or to allocate frequency and/or time resources for communication to one or more nodes or terminals of a network. Generally, any node adapted to provide such functionality may be considered a base station. It may be considered that a base station or more generally a network node, in particular a radio network node, comprises radio circuitry and/or control circuitry for wireless communication. It may be envisioned that a base station or network node is adapted for one or more RATs, in particular LTE/E-UTRA. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in cellular communication, e.g. as a device directly involved or as an auxiliary and/or coordinating node. Generally, a base station may be arranged to communicate with a core network and/or to provide services and/or control to one or more user equipments and/or to relay and/or transport communications and/or data between one or more user equipments and a core network and/or another base station. A network node or base station may generally be adapted to allocate and/or schedule time/frequency resources of a network and/or one or more cells serviced by the base station. An eNodeB (eNB) may be envisioned as an example of a base station, e.g. according to an LTE standard. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a controlling node and/or coordinating node and/or to allocate resources in particular for cellular communication via one or more than one cell.

It may be considered for cellular communication there is provided at least one uplink (UL) connection and/or channel and/or carrier and at least one downlink (DL) connection and/or channel and/or carrier, e.g. via and/or defining a cell, which may be provided by a network node, in particular a base station or eNodeB. An uplink direction may refer to a data transfer direction from a terminal to a network node, e.g. base station and/or relay station. A downlink direction may refer to a data transfer direction from a network node, e.g. base station and/or relay node, to a terminal. UL and DL may be associated to different frequency resources, e.g. carriers and/or spectral bands. A cell may comprise at least one uplink carrier and at least one downlink carrier, which may have different frequency bands.

A network node, e.g. a base station or eNodeB, may be adapted to provide and/or define and/or control one or more cells, e.g. a group of cells, which may be carrier aggregated (CA) cells. The group of cells may comprise at least one primary cell, which may be considered to be a member of the group and/or to be associated to the group. The cell group may comprise one or more secondary cells (it should be noted that every group may comprise secondary cells, not only a secondary group; the secondary in this context refers to being secondary to the primary cell of a group). A primary cell may be adapted and/or utilised for providing control information (in particular allocation data, and/or scheduling and/or allocation information regarding the primary cell and/or the group of cells to and/or from a terminal connected for communication (transmission and reception) and/or configured with the cell. The control information may pertain to the primary cell and/or the group of cells. Each primary cell and/or the associated group may be associated to a specific network node. A master network node may be adapted to provide and/or service and/or define a primary cell in a master cell group. A secondary network node may be adapted to provide and/or service and/or define a secondary cell group.

A terminal may be adapted to be configured with and/or to communicate via master cell group (at least one primary cell) for communicating with a master network node. Additionally, a terminal may be adapted to be configured with and/or to communicate via secondary cell group (at least one (secondary) primary cell) for communicating with a secondary network node; the terminal may generally be adapted for dual connectivity. The terminal may comprise suitable circuitry, e.g. a first transmitter and/or receiver and/or transceiver circuitry (e.g., for communicating with the master network node) and a second first transmitter and/or receiver and/or transceiver circuitry (e.g., for communicating with the secondary network node/s).

A network node, in particular a base station, and/or a terminal, in particular a UE, may be adapted for communication in spectral bands (frequency bands) licensed and/or defined for LTE.

Resources or communication resources may generally be frequency and/or time resources, which may comprises e.g. frames, subframes, slots, resource blocks, carriers, subcarriers, channels, frequency/spectral bands, etc. Allocated or scheduled resources may comprise and/or refer to frequency-related information, in particular regarding one or more carriers and/or bandwidth and/or subcarriers and/or time-related information, in particular regarding frames and/or slots and/or subframes, and/or regarding resource blocks and/or time/frequency hopping information. Transmitting on allocated resources and/or utilizing allocated resources may comprise transmitting data on the resources allocated, e.g. on the frequency and/or subcarrier and/or carrier and/or timeslots or subframes indicated. It may generally be considered that allocated resources may be released and/or de-allocated. A network or a node of a network, e.g. a network node or allocation node, e.g. a base station, may be adapted to determine and/or transmit corresponding allocation or scheduling data, e.g. data indicating release or de-allocation of resources and/or scheduling of UL and/or DL resources. Accordingly, resource allocation may be performed by the network and/or by a network node; a network node adapted for providing resource allocation/scheduling for one or more than one terminals may be considered to be a controlling node. Resources may be allocated and/or scheduled on a cell level and/or by a network node servicing and/or providing the cell.

Allocation data may be considered to be data indicating and/or granting resources allocated by a network node, e.g. a controlling and/or allocation node, in particular data identifying or indicating which resources are reserved or allocated, e.g. for cellular communication, which may generally comprise transmitting and/or receiving data and/or signals; the allocation data may indicate a resource grant or release and/or resource scheduling. A grant or resource grant may be considered to be one example of allocation data. It may be considered that an allocation node is adapted to transmit allocation data directly to a node and/or indirectly, e.g. via a relay node and/or another node or base station. Allocation data may comprise control data and/or be part of or form a message, in particular according to a pre-defined format, for example a DCI format, which may be defined in a standard, e.g. LTE. In particular, allocation data may comprise information and/or instructions to reserve resources or to release resources, which may already be allocated. A terminal may generally be adapted to perform transmission of data to, e.g. UL data, and/or reception of data from, a network node and/or to more than one network nodes, according to allocation data.

Figure 5:
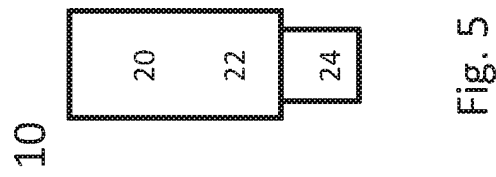
FIG. 5, schematically showing a user equipment.

FIG. 5 schematically shows a user equipment 10. User equipment 10 comprises control circuitry 20, which may comprise a controller connected to a memory. Any module of a user equipment may implemented in and/or executable by, user equipment, in particular the control circuitry 20. User equipment 10 also comprises radio circuitry 22 providing receiving and transmitting or transceiving functionality, the radio circuitry 22 connected or connectable to the control circuitry. An antenna circuitry 24 of the user equipment 10 is connected or connectable to the radio circuitry 22 to collect or send and/or amplify signals. Radio circuitry 22 and the control circuitry 20 controlling it are configured for cellular communication with a network on a first cell/carrier and a second cell/carrier and/or for dual connectivity, in particular utilizing E-UTRAN/LTE resources as described herein. The user equipment 10 may be adapted to carry out any of the methods for operating a terminal disclosed herein; in particular, it may comprise corresponding circuitry, e.g. control circuitry. The antenna circuitry and/or radio circuitry may be adapted to provide at least two independent transmitter circuitries and/or at least two independent receiver circuitries, each of which may be associated or associatable to a different node for dual connectivity. The user equipment may be configured or configurable to associate such circuitry to a node, e.g. based on allocation data and/or control data provided by the network and/or a network node.

Figure 6:
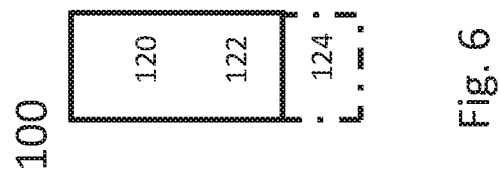
FIG. 6, schematically showing a network node.

FIG. 6 schematically show a network node or base station 100, which in particular may be an eNodeB. Network node 100 comprises control circuitry 120, which may comprise a controller connected to a memory. Any module of a network node, e.g. a receiving module and/or transmitting module and/or control or processing module and/or scheduling module, may be implemented in and/or executable by the network node, in particular the control circuitry 120. The control circuitry 120 is connected to control radio circuitry 122 of the network node 100, which provides receiver and transmitter and/or transceiver functionality. An antenna circuitry 124 may be connected or connectable to radio circuitry 122 for signal reception or transmittance and/or amplification. The network node 100 may be adapted to carry out any of the methods for operating a network node disclosed herein; in particular, it may comprise corresponding circuitry, e.g. control circuitry.

Figure 7:
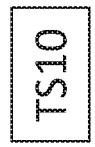
FIG. 7, showing a flowchart of a method for operating a D2D enabled UE.

FIG. 7 shows a flowchart of a method for operating a D2D enabled UE, which may be any D2D enabled UE as described herein. The method may comprise an action TS10 of performing a cell search in an out of coverage condition of the UE. Performing a cell search is based on a first measurement configuration during a first phase, and based on a second measurement configuration during a second phase, wherein the first measurement configuration pertains to a carrier whose sidelink is preconfigured for ProSe operation in out of network coverage operation.

Figure 8:
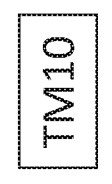

FIG. 8 schematically shows a D2D enabled UE, which may be any D2D enabled UE as described herein. The D2D enabled UE comprises a cell search module TM10 for performing action TS10.

Figure 9:
FIG. 9, showing a flowchart of a method for operating a network node.

FIG. 9 shows a flowchart of a method for operating a network node, which may be any network node as described herein. The method comprises an action NS10 of configuring a D2D enabled UE with a first measurement configuration, wherein the first measurement configuration pertains to a carrier whose sidelink is preconfigured for D2D operation in out of network coverage operation.

Figure 10:
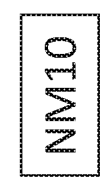

FIG. 10 schematically shows a network node, which may be any network node as described herein. The network node comprises a configuring module NM10 for performing action NS10.

Generally, there may be considered a network node adapted for performing any one of the methods for operating a network node described herein.

There may be considered a user equipment adapted for performing any one of the methods for operating a user equipment described herein.

There is also disclosed a program product comprising code executable by control circuitry, the code causing the control circuitry to carry out and/or control any one of the method for operating a user equipment or network node as described herein, in particular if executed on control circuitry, which may be control circuitry of a user equipment or a network node as described herein.

Moreover, there is disclosed a carrier medium arrangement carrying and/or storing at least any one of the program products described herein and/or code executable by control circuitry, the code causing the control circuitry to perform and/or control at least any one of the methods described herein. A carrier medium arrangement may comprise one or more carrier media. Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A user equipment or terminal being configured with a cell, e.g. a serving cell, and/or carrier, and/or being connected to a network node via a cell, may be in a state in which it may communicate (transmit and/or receive data, e.g. with the network node) using the cell or carrier, e.g. being registered with the network for communication and/or being synchronized to the cell and/or carrier; in particular, the cell may be activated for the user equipment or terminal and/or the latter may be in an RRC_connected or RRC_idle state regarding the cell or the node providing the cell. A user equipment configured with a certain configuration may be set and/or operational according to the configuration; the configuration may be configured by a network and/or network node, e.g. by transmitting corresponding information (the information may represent the configuration).

A user equipment or terminal may be adapted to perform an activation procedure, in which it activates a cell based on a timing message and/or timing parameter received from a network node providing and/or servicing and/or defining and/or scheduling the cell. The activation procedure may be part of an access procedure, in particular a random access procedure.

An access procedure/request may generally be a random access procedure as described herein, e.g. with contention resolution or contention-free. It may be performed between a terminal and/or network node to access and/or time align and/or activate a cell, for the terminal, the cell being provided and/or serviced and/or defined and/or controlled by and/or associated to the network node. An activation procedure may comprise an access procedure. It should be noted that the result of a performed access or activation procedure may be a failure, if the terminal was not able to activate the cell, e.g. due to unfavorable reception conditions.

Synchronization information may generally refer to information regarding the time difference between signals from the master network node, e.g. via the MCG, and the secondary network node, e.g. via the SCG, and/or to the time difference between signals received, by the terminal, via the MCG and the SCG, in particular via the respective primary cells (PCell and PSCell). Synchronization information may refer and/or comprise a synchronization level. A synchronization level may indicate whether the time difference (or its absolute value) lies above a given threshold and/or between given thresholds, e.g. if it is larger than a threshold defining the signals of being synchronized. Generally, a synchronization level may indicate a pre-defined type or mode of synchronization in dual connectivity, as discussed herein. One or more thresholds may be defined as above in terms of types of synchronization. Synchronization information may additionally or alternatively comprise the value and/or absolute value of the time difference.

Configuring a terminal or UE, e.g. by a network or network node, may comprise transmitting, by the network or network node, one or more parameters and/or commands and/or allocation or control data to the terminal or UE, and/or the terminal or UE changing its configuration and/or setup, e.g. based on received parameters and/or commands and/or allocation data from the network and/or the network node.

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may involve one or more than one terminal connected to a wireless communication network and/or more than one node of a wireless communication network and/or in a wireless communication network. It may be envisioned that a node in or for communication, and/or in, of or for a wireless communication network is adapted for communication utilizing one or more RATs, in particular LTE/E-UTRA. A communication may generally involve transmitting and/or receiving messages, in particular in the form of packet data. A message or packet may comprise control and/or configuration data and/or payload data and/or represent and/or comprise a batch of physical layer transmissions. Control and/or configuration data may refer to data pertaining to the process of communication and/or nodes and/or terminals of the communication. It may, e.g., include address data referring to a node or terminal of the communication and/or data pertaining to the transmission mode and/or spectral configuration and/or frequency and/or coding and/or timing and/or bandwidth as data pertaining to the process of communication or transmission, e.g. in a header. Each node or terminal involved in communication may comprise radio circuitry and/or control circuitry and/or antenna circuitry, which may be arranged to utilize and/or implement one or more than one radio access technologies. Radio circuitry of a node or terminal may generally be adapted for the transmission and/or reception of radio waves, and in particular may comprise a corresponding transmitter and/or receiver and/or transceiver, which may be connected or connectable to antenna circuitry and/or control circuitry. Control circuitry of a node or terminal may comprise a controller and/or memory arranged to be accessible for the controller for read and/or write access. The controller may be arranged to control the communication and/or the radio circuitry and/or provide additional services.

Circuitry of a node or terminal, in particular control circuitry, e.g. a controller, may be programmed to provide the functionality described herein. A corresponding program code may be stored in an associated memory and/or storage medium and/or be hardwired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry. Radio access technology may generally comprise, e.g., Bluetooth and/or Wifi and/or WIMAX and/or cdma2000 and/or GERAN and/or UTRAN and/or in particular E-Utran and/or LTE. A communication may in particular comprise a physical layer (PHY) transmission and/or reception, onto which logical channels and/or logical transmission and/or receptions may be imprinted or layered.

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may be between nodes of a wireless communication network and/or in a wireless communication network. It may be envisioned that a node in or for communication, and/or in, of or for a wireless communication network is adapted for, and/or for communication utilizing, one or more RATs, in particular LTE/E-UTRA. A communication may generally involve transmitting and/or receiving messages, in particular in the form of packet data. A message or packet may comprise control and/or configuration data and/or payload data and/or represent and/or comprise a batch of physical layer transmissions. Control and/or configuration data may refer to data pertaining to the process of communication and/or nodes of the communication. It may, e.g., include address data referring to a node of the communication and/or data pertaining to the transmission mode and/or spectral configuration and/or frequency and/or coding and/or timing and/or bandwidth as data pertaining to the process of communication or transmission, e.g. in a header. Each node involved in such communication may comprise radio circuitry and/or control circuitry and/or antenna circuitry, which may be arranged to utilize and/or implement one or more than one radio access technologies. Radio circuitry of a node may generally be adapted for the transmission and/or reception of radio waves, and in particular may comprise a corresponding transmitter and/or receiver and/or transceiver, which may be connected or connectable to antenna circuitry and/or control circuitry. Control circuitry of a node may comprise a controller and/or memory arranged to be accessible for the controller for read and/or write access. The controller may be arranged to control the communication and/or the radio circuitry and/or provide additional services. Circuitry of a node, in particular control circuitry, e.g. a controller, may be programmed to provide the functionality described herein. A corresponding program code may be stored in an associated memory and/or storage medium and/or be hardwired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry. Radio access technology may generally comprise, e.g., Bluetooth and/or Wifi and/or WIMAX and/or cdma2000 and/or GERAN and/or UTRAN and/or in particular E-Utran and/or LTE. A communication may in particular comprise a physical layer (PHY) transmission and/or reception, onto which logical channels and/or logical transmission and/or receptions may be imprinted or layered. A node of a wireless communication network may be implemented as a D2D device and/or user equipment and/or base station and/or relay node and/or any device generally adapted for device-to-device communication. A wireless communication network may comprise at least one of a device configured for device-to-device communication, a D2D device, and/or a user equipment and/or base station and/or relay node, in particular at least one user equipment, which may be arranged for device-to-device communication with a second D2D device or node of the wireless communication network, in particular with a second user equipment.

A node of or for a wireless communication network may generally be a wireless device configured for wireless device-to-device communication, in particular using the frequency spectrum of a cellular and/or wireless communications network, and/or frequency and/or time resources of such a network. Device-to-device communication may optionally include broadcast and/or multicast communication to a plurality of devices or nodes. A cellular network may comprise a network node, in particular a radio network node, which may be connected or connectable to a core network, e.g. a core network with an evolved network core, e.g. according to LTE. The connection between the network node and the core network/network core may be at least partly based on a cable/landline connection. Operation and/or communication and/or exchange of signals involving part of the core network, in particular layers above a base station or eNB, and/or via a predefined cell structure provided by a base station or eNB, may be considered to be of cellular nature or be called cellular operation. Operation and/or communication and/or exchange of signals without involvement of layers above a base station and/or without utilizing a predefined cell structure provided by a base station or eNB, may be considered to be D2D communication or operation, in particular, if it utilises the radio resources, in particular carriers and/or frequencies, and/or equipment (e.g. circuitry like radio circuitry and/or antenna circuitry, in particular transmitter and/or receiver and/or transceiver) provided and/or used for cellular operation.

A user equipment (UE) may generally be a device configured for wireless device-to-device communication (it may be a D2D device) and/or a terminal for a wireless and/or cellular network, in particular a mobile terminal, for example a mobile phone, smart phone, tablet, PDA, etc. A user equipment may be a node of or for a wireless communication network as described herein. It may be envisioned that a user equipment or D2D device is adapted for one or more RATs, in particular LTE/E-UTRA. A user equipment may generally be proximity services (ProSe) enabled, which may mean it is D2D capable or enabled. It may be considered that a user equipment comprises radio circuitry and/or control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A node or device of or for a wireless communication network may generally be a user equipment or D2D device. It may be considered that a user equipment is configured to be a user equipment adapted for and/or according to LTE/E-UTRAN.

A base station may be any kind of base station of a wireless and/or cellular network adapted to serve one or more user equipments. It may be considered that a base station is a node of a wireless communication network. A base station may be adapted to provide and/or define one or more cells of the network and/or to allocate or schedule frequency and/or time resources for communication to one or more nodes of a network, in particular UL resources, for example for device-to-device communication, which may be communication between devices different from the base station. Generally, any node adapted to provide such functionality may be considered a base station. It may be considered that a base station or more generally a network node, in particular a radio network node, comprises radio circuitry and/or control circuitry for wireless communication. It may be envisioned that a base station or network node is adapted for one or more RATs, in particular LTE/E-UTRA. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in device-to-device communication, e.g. as a device directly involved or as an auxiliary and/or coordinating node. Generally, a base station may be arranged to communicate with a core network and/or to provide services and/or control to one or more user equipments and/or to relay and/or transport communications and/or data between one or more user equipments and a core network and/or another base station and/or be Proximity Service enabled. An eNodeB (eNB) may be envisioned as an example of a base station, in particular according to LTE. A base station may generally be proximity service enabled and/or to provide corresponding services. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a controlling node and/or to allocate resources in particular for device-to-device communication between two nodes of a wireless communication network, in particular two user equipments.

A storage medium may be adapted to store data and/or store instructions executable by control circuitry and/or a computing device, the instruction causing the control circuitry and/or computing device to carry out and/or control any one of the methods described herein when executed by the control circuitry and/or computing device. A storage medium may generally be computer-readable, e.g. an optical disc and/or magnetic memory and/or a volatile or non-volatile memory and/or flash memory and/or RAM and/or ROM and/or EPROM and/or EEPROM and/or buffer memory and/or cache memory and/or a database.

Resources or communication resources may generally be frequency and/or time resources. Allocated or scheduled resources may comprise and/or refer to frequency-related information, in particular regarding one or more carriers and/or bandwidth and/or subcarriers and/or time-related information, in particular regarding frames and/or slots and/or subframes, and/or regarding resource blocks and/or time/frequency hopping information. Allocated resources may in particular refer to UL and/or DL resources, e.g. UL resources for UE to transmit. Transmitting on allocated resources and/or utilizing allocated resources may comprise transmitting data on the resources allocated, e.g. on the frequency and/or subcarrier and/or carrier and/or timeslots or subframes indicated. It may generally be considered that allocated resources may be released and/or de-allocated. A network or a node of a network, e.g. an allocation or controlling or serving node, may be adapted to determine and/or transmit corresponding allocation data indicating release or de-allocation of resources to one or more UE. Accordingly, resource allocation may be performed by the network and/or by a node, in particular a node within and/or within a cell of a cellular network covering a UE participating or intending to participate in dual connectivity. In dual connectivity, more than one node may be a serving and/or controlling node, providing allocation data regarding the resources utilized for communication between itself and the UE.

Allocation data may be considered to be data indicating and/or granting resources allocated by the allocation node, in particular data identifying or indicating which resources are reserved or allocated for communication for a UE and/or which resources a UE may use for communication and/or data indicating a resource grant or release. A grant or resource grant may be considered to be one example of allocation data. It may be considered that an allocation node is adapted to transmit allocation data directly to a node and/or indirectly, e.g. via a relay node and/or another node or base station. Allocation data may comprise control data and/or be part of or form a message, in particular according to a pre-defined format, for example a DCI format, which may be defined in a standard, e.g. LTE. In particular, allocation data may comprise information and/or instructions to reserve resources or to release resources, which may already be allocated. Generally, allocation data may indicate and/or instruct transmission mode and/or configuration, in particular regarding a power level of transmission. A UE may generally be adapted for configuring itself according to allocation data, in particular to set a corresponding power level and/or timing of UL and DL operations.

A network device or node and/or a user equipment may be or comprise a software/program arrangement arranged to be executable by a hardware device, e.g. control circuitry, and/or storable in a memory, which may provide dual connectivity functionality and/or corresponding control functionality and/or control functionality to carry out any one of the methods described herein and/or to implement any one or more than one functionalities of a user equipment and/or network node described herein.

Radio spectrum: Although at least some of the embodiments may be described for D2D transmissions in the UL spectrum (FDD) or UL resources (TDD), the embodiments are not limited to the usage of UL radio resources, neither to licensed or unlicensed spectrum, or any specific spectrum at all.

A cellular network or mobile or wireless communication network may comprise e.g. an LTE network (FDD or TDD), UTRA network, CDMA network, WiMAX, GSM network, any network employing any one or more radio access technologies (RATs) for cellular operation. The description herein is given for LTE, but it is not limited to the LTE RAT.

RAT (radio access technology) may generally include: e.g. LTE FDD, LTE TDD, GSM, CDMA, WCDMA, WiFi, WLAN, WiMAX, etc.

A measurement gap may refer to a time gap or interval, in which no transmission and reception happens, in particular regarding a serving cell or a given carrier. Since there is no signal transmission and reception during the gap (at least in the serving cell or given carrier), a D2D device or UE can switch to another or a target cell or carrier and/or perform a measurement on the target cell or carrier, e.g. for signal quality, utilizing the same receiver.

The term "intra-frequency" may refer to issued related to the same frequency/bandwith and/or carrier, e.g. between neighboring cells (which may be provided by different BSs) having the same frequencies available. The term "inter-frequency" may refer to issues related to different frequencies/bandwidths and/or carriers, e.g. between different carriers in a multi-carrier arrangement.

A receiving operation may comprise a measurement operation, e.g. a signal quality measurement, which may be performed in a measurement gap, in which a receiver switching to a carrier/frequency to be measured may be performed.

A network node may be a radio network node (which may be adapted for wireless or radio communication, e.g. with a UE) or another network node. A network node generally may be a controlling node. Some examples of a radio network node or controlling node are a radio base station, in particular an eNodeB, a relay node, an access point, a cluster head, RNC, etc. The radio network node may be comprised in a mobile communication network and may support and/or be adapted for cellular operation or communication and/or D2D operation or communication. A network node, in particular a radio network node, may comprise radio circuitry and/or control circuitry, in particular for wireless communication. Some examples of a network node, which is not a radio network node, may comprise: a core network node, MME, a node controlling at least in part mobility of a wireless device, SON node, O&M node, positioning node, a server, an application server, an external node, or a node comprised in another network. Any network node may comprise control circuitry and/or a memory. A network node may be considered to be serving a node or UE, if it provides a cell of a cellular network (which may be called serving cell) to the served node or UE and/or is connected or connectable to the UE via and/or for transmission and/or reception and/or UL and/or DL data exchange or transmission and/or if the network node is adapted to provide the UE with allocation and/or configuration data and/or a measurement performance characteristic and/or to configure the D2D device or UE.

Multiple carrier frequencies or functionality may refer to any of: different carrier frequencies within the same frequency band or within different frequency bands, same PLMN or different PLMNs, same RAT or different RATs. D2D operation may or may not occur on dedicated carrier frequencies. DL and UL carrier frequencies in FDD are also examples of different carrier frequencies.

A frequency band herein may be FDD, TDD, HD-FDD, or unidirectional (e.g., DL-only band such as Band 29, in some examples). Multiple carrier functionality may include carrier aggregation functionality, in which multiple carriers or cells are used for transmission and/or reception between two participants of communication. The carriers may be continuous in the spectrum or discontinuous.

Each or any one of the network nodes or user equipments shown in the figures may be adapted to perform the methods to be carried out by a user equipment described herein. Alternatively or additionally, each or any of the user equipments shown in the figures may comprise any one or any combination of the features of a user equipment described herein. Each or any one of the network nodes or controlling nodes or eNBs or base stations shown in the figures may be adapted to perform the methods to be carried out by network node or base station described herein. Alternatively or additionally, the each or any one of the controlling or network nodes or eNBs or base stations shown in the figures may comprise any one or any one combination of the features of a network node or eNB or base station described herein.

Some useful abbreviations comprise
Abbreviation Explanation
DCI Downlink Control Information
eNB evolved NodeB, base station
TTI Transmission-Time Interval
UE User Equipment
UL Uplink
DRS Discovery Reference Signal
SCell Secondary Cell
SRS Sounding Reference Signal
PCFICH Physical Control Format Indicator Channel
PDCCH Physical Downlink Control Channel
PUSCH Physical Uplink Shared Channel
PUCCH Physical Uplink Control Channel
RRM Radio Resource Management
CIS Transmission Confirmation Signal
ACK Acknowledged
ADC Analog-to-digital conversion
AGC Automatic gain control
ANR Automatic neighbor relations
BCH Broadcast channel
BLER Block error rate
BS Base station
BSC Base station controller
BTS Base transceiver station
CA Carrier aggregation
CC Component carrier
CG Cell group
CGI Cell global identity
CP Cyclic prefix
CPICH Common pilot channel
CSG Closed subscriber group
DAS Distributed antenna system
DC Dual connectivity
DFT Discrete Fourier Transform
DL Downlink
DL-SCH Downlink shared channel
DRX Discontinuous reception
EARFCN Evolved absolute radio frequency channel number
ECGI Evolved CGI
eNB eNodeB
FDD Frequency division duplex
FFT Fast Fourier transform
HD-FDD Half duplex FDD
HO Handover
M2M machine to machine
MAC Media access control
MCG Master cell group
MDT Minimization of drive tests
MeNB Master eNode B
MME Mobility management entity
MRTD Maximum receive timing difference
MSR Multi-standard radio
NACK Not acknowledged
OFDM Orthogonal frequency division multiplexing
SI System Information
PCC Primary component carrier
PCI Physical cell identity
PCell Primary Cell
PCG Primary Cell Group
PCH Paging channel
PDU Protocol data unit
PGW Packet gateway
PHICH Physical HARQ indication channel
PLMN Public land mobile network
PSCell Primary SCell
PSC Primary serving cell
PSS Primary synchronization signal
RAT Radio Access Technology
RF Radio frequency
RLM Radio link monitoring
RNC Radio Network Controller
RRC Radio resource control
RRH Remote radio head
RRU Remote radio unit
RSCP Received signal code power
RSRP Reference Signal Received Power
RSRQ Reference Signal Received Quality
RSSI Received signal strength indication
RSTD Reference signal time difference
SCC Secondary component carrier
SCell Secondary Cell
SCG Secondary Cell Group
SeNB Secondary eNode B
SFN System frame number
SGW Signaling gateway
SINR Signal to interference and noise ratio
SON Self-organizing networks
SSC Secondary serving cell
SSS Secondary synchronization signal
TA Timing advance
TAG Timing advance group
TDD Time division duplex
Tx Transmitter
UARFCN UMTS Absolute Radio Frequency Channel Number
UE User equipment
3GPP 3$^{rd}$ Generation Partnership Project
Ack/Nack Acknowledgment/Non-Acknowledgement, also A/N
AP Access point
BER/BLER Bit Error Rate, BLock Error Rate;
BS Base Station
CA Carrier Aggregation
CC component carrier (a carrier in a carrier aggregate)
CoMP Coordinated Multiple Point Transmission and Reception
CQI Channel Quality Information
CRS Cell-specific Reference Signal
CSI Channel State Information
CSI-RS CSI reference signal
D2D Device-to-device
DL Downlink
EPDCCH Enhanced Physical DL Control CHannel
DL Downlink; generally referring to transmission of data to a node/into a direction further away from network core (physically and/or logically); in particular from a base station or eNodeB to a D2D enabled node or UE; often uses specified spectrum/bandwidth/band different from UL (e.g. LTE FDD)
eNB evolved NodeB; a form of base station, also called eNodeB
E-UTRA/N Evolved UMTS Terrestrial Radio Access/Network, an example of a RAT
f1, f2, f3, . . . , fn carriers/carrier frequencies; different numbers may indicate that the referenced carriers/frequencies are different
f1_UL, . . . , fn_UL Carrier for Uplink/in Uplink frequency or band f1_DL, . . . , fn_DL Carrier for Downlink/in Downlink frequency or band
FDD Frequency Division Duplexing
ID Identity
L1 Layer 1
L2 Layer 2
LTE Long Term Evolution, a telecommunications standard
MAC Medium Access Control
MBSFN Multiple Broadcast Single Frequency Network
MDT Minimisation of Drive Test
MME Mobility Management Entity; a control entity of a wireless communication network (LTE) providing control functionality e.g. for radio network nodes like eNBs
NW Network
OFDM Orthogonal Frequency Division Multiplexing
O&M Operational and Maintenance
OSS Operational Support Systems
PC Power Control
PCell Primary Cell (e.g. in CA, in particular a primary cell of a Master Cell Group)
PDCCH Physical DL Control CHannel
PH Power Headroom
PHR Power Headroom Report
Pscell primary cell of a secondary cell group
PSS Primary Synchronization Signal
PUSCH Physical Uplink Shared CHannel
R1, R2, . . . , Rn Resources, in particular time-frequency resources, in particular assigned to corresponding carrier f1, f2, . . . , fn
RA Random Access
RACH Random Access Channel
RAN Radio Access Network
RAT Radio Access Technology
RE Resource Element
RB Resource Block
RRH Remote radio head
RRM Radio Resource Management
RRU Remote radio unit
RSRQ Reference signal received quality
RSRP Reference signal received power
RSSI Received signal strength indicator
RX reception/receiver, reception-related
SA Scheduling Assignment
SCell Secondary Cell (e.g. in CA)
SINR/SNR Signal-to-Noise-and-Interference Ratio; Signal-to-Noise Ratio
SFN Single Frequency Network
SON Self Organizing Network
SSS Secondary Synchronization Signal
TPC Transmit Power Control
TX transmission/transmitter, transmission-related
TDD Time Division Duplexing
UE User Equipment
UL Uplink; generally referring to transmission of data to a node/into a direction closer to a network core (physically and/or logically); in particular from a D2D enabled node or UE to a base station or eNodeB; in the context of D2D, it may refer to the spectrum/bandwidth/band utilized for transmitting in D2D, which may be the same used for UL communication to a eNB in cellular communication; in some D2D variants, transmission by all devices involved in D2D communication may in some variants generally be in UL spectrum/bandwidth/carrier/frequency
DC Dual Connectivity
MCG Main Cell Group
SCG Secondary Cell Group
PCell Primary Cell
PSCell Primary SCell
SCell Secondary Cell
RACH Random Access CHannel
MeNB Master eNodeB
SeNB Secondary eNodeB
pSCell Primary SCell
PCC Primary component carrier
PCI Physical cell identity
PSS Primary synchronization signal
RAT Radio Access Technology
RRC Radio resource control
RSCP Received signal code power
RSRP Reference Signal Received Power
RSRQ Reference Signal Received Quality
RSSI Received signal strength indication
SCC Secondary component carrier
SIB System information block
SON Self-organizing networks
SSS Secondary synchronization signal
TDD Time division duplex
UARFCN UMTS Absolute Radio Frequency Channel Number
HO Handover
UE User equipment
RNC Radio Network Controller
BSC Base station Controller
PCell Primary Cell
SCell Secondary Cell These and other abbreviations may be used according to LTE standard definitions.

In this description, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other embodiments and variants that depart from these specific details. For example, the concepts and variants are partially described in the context of Long Term Evolution (LTE) or LTE-Advanced (LTE-A) mobile or wireless communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

A serving carrier may be a carrier associated to a serving cell.

A carrier may generally refer to a frequency band or bandwidth available for communication, e.g. according to a standard like LTE. A carrier may be divided into subcarriers.

It may be considered that for FDD, a carrier is allocated and/or used (only) for UL communication or DL communication. There may be defined (e.g. by a standard like LTE) and/or configured or chosen (e.g., by a network node like an eNodeB according to a standard) combinations of carriers (pair bands) comprising one UL carrier and at least one DL carrier in combination for FDD. Thus, for each UL carrier, there may be at least one associated DL carrier. For TDD, a carrier may be used for UL and DL communication, depending on allocation, such that the carrier may be shared for both directions. For D2D, a carrier (carriers) designated for UL may be used or configured (for or of a sidelink). Thus, in FDD, a sidelink whose carrier is preconfigured for D2D may comprise an UL carrier which is used for D2D operation, and an associated DL carrier, which may be associated to a cell and/or be used for control signaling, but generally may not necessarily be used for D2D operation (it may not be used at all when the UL carrier is allocated for D2D operation). In TDD, a sidelink whose carrier is preconfigured for D2D may comprise one carrier, which may be carrier available for UL and DL for cellular communication (if allocated accordingly, e.g. time-shared with D2D operation), e.g. according to a standard like LTE. Carrier aggregation utilizing a plurality of the sidelink types, respectively associated carrier types, described herein may be considered.

It should be noted that in the above, depending on the application or embodiment referred to, a reference to a time or time difference, e.g. T1, delta1 or delta2, may identify a time threshold or an elapsed time since a certain time reference, e.g. a time when the elapsed time started to be measure or run. From the context of the respective disclosure it is believed to be clear which interpretation of the reference is valid.

A cell search may general refer to searching for and/or identifying a cell of a cellular network.

A carrier whose sidelink is preconfigured for D2D or ProSe operation in out of network coverage operation may comprise and/or refer to a carrier the UE has been configured with for using for D2D operation specifically for OON situations, and/or while being in network coverage and/or before leaving network coverage. The configuration may be according to a standard (e.g., for carriers specifically for OON situations), and/or be configured by a network node, e.g. eNodeB, while in coverage with that eNodeB.

A measurement configuration pertaining to a carrier may be considered to indicate that a cell search is to be performed on the carrier. A measurement configuration generally may indicate and/or comprise indication/s or parameter/s used for measurements, in particular in the context of cell search, e.g. a carrier, and optionally power-related indications/s or parameter/s and/or timing or synchronization-related indications/s or parameter/s and/or modulation and/or encoding-related indications/s or parameter/s, and/or information/ indication/s or parameter/s pertaining to the phase during which the measurement configuration is valid/to be used for cell search.

Preconfiguring a D2D enabled UE may pertain to the UE having information pertaining and/or indicating the preconfigured carrier or configuration (in particular, a carrier and/or measurement configuration) in a memory, e.g. according to a standard and/or based on configuring performed by a network node, e.g. in advance and/or before entering the OOC condition.

The invention claimed is:

1. A Device-to-Device, D2D, enabled User Equipment, UE, for a cellular communication network, the D2D enabled UE comprising control circuitry adapted for performing a cell search in an out of coverage condition of the D2D enabled UE, wherein performing the cell search is based on a first measurement configuration during a first phase, and performing the cell search is based on a second measurement configuration during a second phase, wherein the first measurement configuration pertains to a carrier whose sidelink is preconfigured for D2D operation in an out of network coverage operation and wherein a first set of carriers that is searched based on the first measurement configuration during the first phase comprises less than all of a second set of carriers that is searched based on the second measurement configuration during the second phase.

2. The D2D enabled UE of claim 1, wherein the control circuitry comprises one or more of a processor, a microprocessor, and a microcontroller.

3. The D2D enabled UE of claim 1, wherein the control circuitry comprises a Field-Programmable Gate Array (FPGA) device and/or an Application Specific Integrated Circuit (ASIC) device.

4. The D2D enabled UE of claim 1, wherein the control circuitry comprises, or is configured to couple to, memory configured to be accessible for reading and/or writing by the control circuitry.

5. The D2D enabled UE of claim 1, wherein the second phase is not performed if the D2D enabled UE detects a cell during the first phase.

6. A network node for a wireless communication network, the network node comprising control circuitry adapted for configuring a Device-to-Device, D2D, enabled User Equipment, UE, with a first measurement configuration for performing a cell search during a first phase and a second measurement configuration for performing a cell search during a second phase, wherein the first measurement configuration pertains to a carrier whose sidelink is preconfigured for D2D operation in an out of network coverage operation and wherein a first set of carriers that is searched based on the first measurement configuration during the first phase comprises less than all of a second set of carriers that is searched based on the second measurement configuration during the second phase.

7. The network node of claim 6, wherein the control circuitry comprises one or more of a processor, a microprocessor, and a microcontroller.

8. The network node of claim 6, wherein the control circuitry comprises a Field-Programmable Gate Array (FPGA) device and/or an Application Specific Integrated Circuit (ASIC) device.

9. The network node of claim 6, wherein the control circuitry comprises, or is configured to couple to, memory configured to be accessible for reading and/or writing by the control circuitry.

10. The network node of claim 6, wherein the second phase is not performed if the D2d enabled UE detects a cell during the first phase.

11. A computer program product comprising a non-transitory computer readable medium storing a computer program having instructions executable by control circuitry, the instructions which, when executed, cause the control circuitry to perform a cell search in an out of coverage condition of a Device-to-Device, D2D enabled User Equipment, UE, wherein performing the cell search is based on a first measurement configuration during a first phase, and performing the cell search is based on a second measurement configuration during a second phase, wherein the first measurement configuration pertains to a carrier whose sidelink is preconfigured for D2D operation in an out of network coverage operation and wherein a first set of carriers that is searched based on the first measurement configuration during the first phase comprises less than all of a second set of carriers that is searched based on the second measurement configuration during the second phase.

12. The computer program product of claim 11, wherein the instructions are configured to be stored in an associated memory or storage medium.

13. The computer program product of claim 11, wherein the instructions are configured to be provided as software.

14. The computer program product of claim 11, wherein the instructions are configured to be provided as firmware.

15. The computer program product of claim 11, wherein the instructions are configured to be executable by control circuitry comprising a processor.

16. The computer program product of claim 11, wherein the instructions are configured to be stored in the D2D enabled UE and the instructions are executable by control circuitry in the D2D enabled UE.

17. The computer program product of claim 11, wherein the instructions are configured to be stored in a network node adapted for configuring the D2D enabled UE, and wherein the instructions are executable by control circuitry in the network node.

18. The computer program product of claim 11, wherein the instructions, when executed, are configured to cause a computing device to control or configure the D2D enabled UE to perform the cell search when executed by the computing device.

19. The computer program product of claim 11, wherein the instructions, when excuted, are configured to cause a computing device to control or configure a network node to perform the cell search when executed by the computing device.

20. The computer program product of claim 12, wherein the storage medium is one or more of a computer-readable medium selected from a group consisting of: an optical disc, magnetic memory, volatile memory, non-volatile memory, flash memory, random-access memory (RAM), read-only memory (ROM), erasable programmable read-only memory (EPROM), electrically erasable programmable read-only memory (EEPROM), buffer memory, cache memory, and a database.

* * * * *